(12) United States Patent
Tabata et al.

(10) Patent No.: US 11,628,821 B2
(45) Date of Patent: Apr. 18, 2023

(54) CONTROLLING ENGINE SPEED DURING ACCELERATION OF A HYBRID VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Yasuhiro Hiasa, Miyoshi (JP); Yasutaka Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 16/934,469

(22) Filed: Jul. 21, 2020

(65) Prior Publication Data
US 2021/0031747 A1 Feb. 4, 2021

(30) Foreign Application Priority Data

Aug. 2, 2019 (JP) .............................. JP2019-143334

(51) Int. Cl.
| | |
|---|---|
| *F02D 41/10* | (2006.01) |
| *B60W 20/15* | (2016.01) |
| *B60W 30/188* | (2012.01) |
| *B60W 10/06* | (2006.01) |
| *B60W 10/10* | (2012.01) |

(52) U.S. Cl.
CPC ............ *B60W 20/15* (2016.01); *B60W 10/06* (2013.01); *B60W 10/10* (2013.01); *B60W 30/188* (2013.01); *B60W 2510/0638* (2013.01); *B60W 2710/0677* (2013.01)

(58) Field of Classification Search
CPC ...... B60W 20/15; B60W 10/06; B60W 10/10; B60W 30/188; B60W 2510/0638; B60W 2710/0677
See application file for complete search history.

(56) References Cited

U.S. PATENT DOCUMENTS

| | | | | |
|---|---|---|---|---|
| 2015/0233305 | A1* | 8/2015 | Takasaki | F02D 11/105 |
| | | | | 701/102 |
| 2018/0162350 | A1* | 6/2018 | Kim | B60W 20/10 |

FOREIGN PATENT DOCUMENTS

| | | |
|---|---|---|
| JP | 2015-128954 A | 7/2015 |
| JP | 2015-128955 A | 7/2015 |

* cited by examiner

*Primary Examiner* — Gonzalo Laguarda
(74) *Attorney, Agent, or Firm* — Hunton Andrews Kurth LLP

(57) ABSTRACT

When an acceleration request is issued, an electronic control unit for a hybrid vehicle performs control for producing an acceleration feeling of setting a target engine rotation speed to an initial rotation speed (=basic initial value+initial value correction value) which is lower than an optimal-fuel-efficiency rotation speed at which required engine power is able to be most efficiently output and increasing the engine rotation speed from the initial rotation speed to the optimal-fuel-efficiency rotation speed at a rotation speed increase rate (=basic increase rate+increase rate correction value) based on the elapse of time. When the target supercharging pressure is high, the initial value correction value is set to a greater value and the increase rate correction value is set to a greater value than when the target supercharging pressure is low.

3 Claims, 9 Drawing Sheets

FIG. 6

| TRAVEL MODE | | | | C1 | B1 | MG1 | MG2 |
|---|---|---|---|---|---|---|---|
| EV | FORWARD/ REVERSE | SINGLE-MOTOR DRIVE | DRIVE | | | G | M |
| | | | USE IN COMBINATION WITH ENGINE BRAKE | △ | △ | G | M |
| | | DOUBLE-MOTOR DRIVE | | ○ | ○ | M | M |
| HV | FORWARD | HIGH | | | ○ | G | M |
| | | LOW | | ○ | | G | M |
| | REVERSE | LOW | | ○ | | G | M |

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

CONTROLLING ENGINE SPEED DURING ACCELERATION OF A HYBRID VEHICLE

CROSS-REFERENCE TO RELATED APPLICATION

This application claims priority to Japanese Patent Application No. 2019-143334 filed on Aug. 2, 2019, incorporated herein by reference in its entirety.

BACKGROUND

1. Technical Field

The disclosure relates to a control device for a hybrid vehicle in which power which is output from an engine with a supercharger is transmitted to driving wheels via a stepless transmission.

2. Description of Related Art

A control device for a hybrid vehicle that performs control for producing an acceleration feeling is known. An example thereof is a control device for a hybrid vehicle described in Japanese Unexamined Patent Application Publication No. 2015-128955 (JP 2015-128955 A). In the control device for a hybrid vehicle described in JP 2015-128955 A, control for producing an acceleration feeling is performed and an output shortage of engine power which is generated through the control for producing an acceleration feeling is complemented with drive power from a rotary machine. When a state of charge of a battery that drives the rotary machine decreases, control is performed such that occurrence of a shortage of vehicle drive power is curbed.

SUMMARY

In performing control for producing an acceleration feeling in response to an acceleration request, there is a likelihood that a supercharging response delay will occur in the engine with a supercharger and an output shortage of the engine for required engine power will increase. When it is intended to supplement the output shortage using the rotary machine, this supplementation may not be accomplished due to constraints of the battery and thus there is concern about a decrease in acceleration performance.

The disclosure provides a control device for a hybrid vehicle that can curb a decrease in acceleration performance which is caused by an output shortage of an engine with a supercharger due to a supercharging response delay of the engine in performing control for producing an acceleration feeling.

According to a first aspect of the disclosure, there is provided a control device for (A) a hybrid vehicle including an engine with a supercharger, a stepless transmission that is provided in a power transmission path between the engine and driving wheels, and a rotary machine that is connected to the power transmission path and using the engine and the rotary machine as drive power sources, the control device including (B) a drive control unit configured (b1) to perform control for producing an acceleration feeling of setting a target value of an engine rotation speed to an initial rotation speed which is lower than an optimal-fuel-efficiency rotation speed at which the engine is able to most efficiently output required engine power, increasing the target value of the engine rotation speed from the initial rotation speed to the optimal-fuel-efficiency rotation speed at a rotation speed increase rate based on at least one of an increase in a vehicle speed and elapse of time, and controlling the stepless transmission such that the engine rotation speed reaches the target value when an acceleration request is issued and (b2) to control the rotary machine such that an output shortage of the engine for the required engine power which is caused by the engine rotation speed becoming less than the optimal-fuel-efficiency rotation speed through the control for producing the acceleration feeling is supplemented, (C) wherein the drive control unit is configured (c1) to set the initial rotation speed or a lower limit of the initial rotation speed based on a target supercharging pressure of the engine or an amount of change of the target supercharging pressure at the time of start of the control for producing the acceleration feeling and (c2) to set the initial rotation speed or the lower limit thereof to a greater value when the target supercharging pressure is high than when the target supercharging pressure is low or when the amount of change of the target supercharging pressure is great than when the amount of change of the target supercharging pressure is small.

A second aspect of the disclosure provides the control device for a hybrid vehicle according to the first aspect, wherein the drive control unit is configured to set the initial rotation speed or the lower limit thereof to a greater value as the target supercharging pressure increases or as the amount of change of the target supercharging pressure increases.

A third aspect of the disclosure provides the control device for a hybrid vehicle according to the first or second aspect, (A) wherein the drive control unit is configured (a1) to set the rotation speed increase rate based on the target supercharging pressure or the amount of change of the target supercharging pressure and (a2) to set the rotation speed increase rate to a greater value when the target supercharging pressure is high than when the target supercharging pressure is low or when the amount of change of the target supercharging pressure is great than when the amount of change of the target supercharging pressure is small.

A fourth aspect of the disclosure provides the control device for a hybrid vehicle according to any one of the first to third aspects, wherein the drive control unit is configured to set the rotation speed increase rate to a greater value as the target supercharging pressure increases or as the amount of change of the target supercharging pressure increases.

The control device for a hybrid vehicle according to the first aspect includes (A) the drive control unit configured (a1) to perform control for producing an acceleration feeling of setting a target value of an engine rotation speed to an initial rotation speed which is lower than an optimal-fuel-efficiency rotation speed at which the engine is able to most efficiently output required engine power, increasing the target value of the engine rotation speed from the initial rotation speed to the optimal-fuel-efficiency rotation speed at a rotation speed increase rate based on at least one of an increase in a vehicle speed and elapse of time, and controlling the stepless transmission such that the engine rotation speed reaches the target value when an acceleration request is issued and (a2) to control the rotary machine such that an output shortage of the engine for the required engine power which is caused by the engine rotation speed becoming less than the optimal-fuel-efficiency rotation speed through the control for producing the acceleration feeling is supplemented. (B) The drive control unit is configured (b1) to set the initial rotation speed or a lower limit of the initial rotation speed based on a target supercharging pressure of the engine or an amount of change of the target supercharging pressure at the time of start of the control for producing the acceleration feeling and (b2) to set the initial rotation speed or the lower limit thereof to a greater value when the target supercharging pressure is high than when the target supercharging pressure is low or when the amount of change of the target supercharging pressure is great than when the amount of change of the target supercharging pressure is small. An output shortage of the engine due to a response delay of the supercharging pressure is more likely to occur when the target supercharging pressure is high than when the target supercharging pressure is low. In addition, an output shortage of the engine due to a response delay of the supercharging pressure is more likely to occur when the amount of change of the target supercharging pressure is great than when the amount of change of the target supercharging pressure is small. Accordingly, when an output shortage of the engine is likely to occur, the initial rotation speed of the engine in the control for producing the acceleration feeling or the lower limit of the initial rotation speed is set to a great value such that the engine rotation speed increases in an early stage. As a result, it is possible to curb a decrease in acceleration performance due to a response delay of the supercharging pressure.

With the control device for a hybrid vehicle according to the second aspect, the drive control unit sets the initial rotation speed or the lower limit thereof to a greater value as the target supercharging pressure increases or as the amount of change of the target supercharging pressure increases. An output shortage of the engine due to a response delay of the supercharging pressure is more likely to occur as the target supercharging pressure becomes greater. In addition, an output shortage of the engine due to a response delay of the supercharging pressure is more likely to occur as the amount of change of the target supercharging pressure becomes greater. Accordingly, when an output shortage of the engine is likely to occur, the initial rotation speed of the engine in the control for producing the acceleration feeling or the lower limit of the initial rotation speed is set to a great value and thus it is possible to curb a decrease in acceleration performance due to a response delay of the supercharging pressure.

With the control device for a hybrid vehicle according to the third aspect, (A) the drive control unit (a1) sets the rotation speed increase rate based on the target supercharging pressure or the amount of change of the target supercharging pressure and (a2) sets the rotation speed increase rate to a greater value when the target supercharging pressure is high than when the target supercharging pressure is low or when the amount of change of the target supercharging pressure is great than when the amount of change of the target supercharging pressure is small. An output shortage of the engine due to a response delay of the supercharging pressure is more likely to occur when the target supercharging pressure is high than when the target supercharging pressure is low. In addition, an output shortage of the engine due to a response delay of the supercharging pressure is more likely to occur when the amount of change of the target supercharging pressure is great than when the amount of change of the target supercharging pressure is small. Accordingly, when an output shortage of the engine is likely to occur, the rotation speed increase rate of the engine in the control for producing the acceleration feeling is set to a great value such that the engine rotation speed increases rapidly. As a result, it is possible to curb a decrease in acceleration performance due to a response delay of the supercharging pressure.

With the control device for a hybrid vehicle according to the fourth aspect, the drive control unit sets the rotation speed increase rate to a greater value as the target supercharging pressure increases or as the amount of change of the target supercharging pressure increases. An output shortage of the engine due to a response delay of the supercharging pressure is more likely to occur as the target supercharging pressure becomes greater. In addition, an output shortage of the engine due to a response delay of the supercharging pressure is more likely to occur as the amount of change of the target supercharging pressure becomes greater. Accordingly, when an output shortage of the engine is likely to occur, the rotation speed increase rate of the engine in the control for producing the acceleration feeling is set to a great value and thus it is possible to curb a decrease in acceleration performance due to a response delay of the supercharging pressure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is an engagement operation table illustrating a relationship between travel modes and combinations of operating states of a clutch and a brake which are used therein;

FIG. 7A illustrates a relationship between the target supercharging pressure and the initial value correction value, FIG. 7B illustrates a relationship between the target supercharging pressure and the increase rate correction value, and FIG. 7C illustrates a relationship between the target supercharging pressure and the lower limit correction value;

FIG. 9A illustrates an example in which an initial rotation speed is corrected with an initial value correction value, FIG. 9B illustrates an example in which a rotation speed increase rate is corrected with an increase rate correction value, and FIG. 9C illustrates an example in which a lower-limit rotation speed is corrected with a lower limit correction value;

DETAILED DESCRIPTION OF EMBODIMENTS

Hereinafter, embodiments of the disclosure will be described in detail with reference to the accompanying drawings. In the following embodiments, the drawings are appropriately simplified or modified, and dimensional ratios, shapes, and the like of constituent elements are not necessarily accurate.

Figure 1:
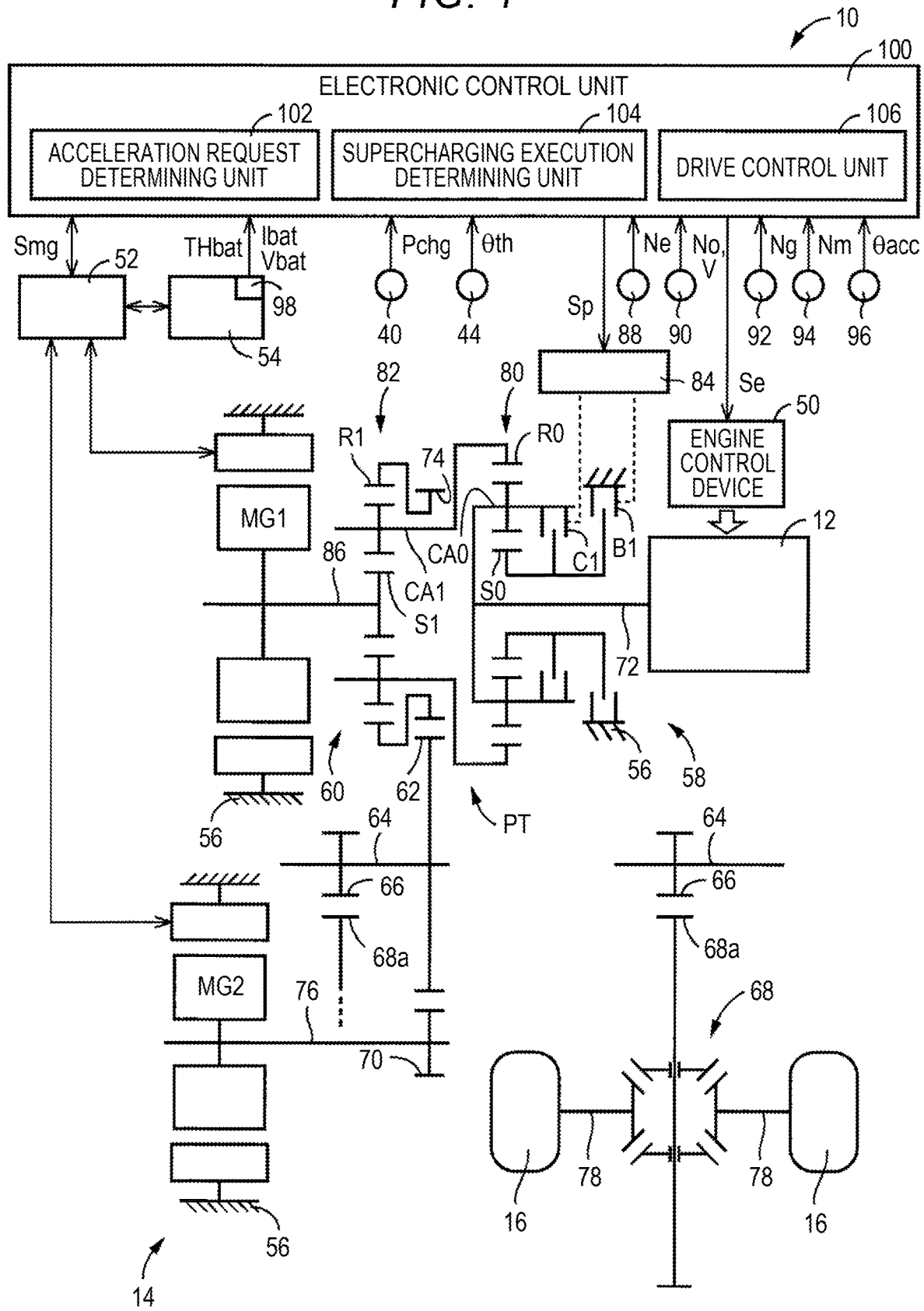
FIG. 1 is a functional block diagram schematically illustrating a configuration of a hybrid vehicle in which an electronic control unit according to a first embodiment of the disclosure is mounted and illustrating principal parts of a control function for various types of control in the hybrid vehicle.

FIG. 1 is a diagram schematically illustrating a configuration of a hybrid vehicle 10 in which an electronic control unit 100 according to a first embodiment of the disclosure is mounted and illustrating a principal part of a control function for various types of control in the hybrid vehicle 10. The hybrid vehicle 10 (hereinafter referred to as a "vehicle 10") includes an engine 12, a first rotary machine MG, a second rotary machine MG2, a power transmission device 14, and driving wheels 16.

Figure 2:
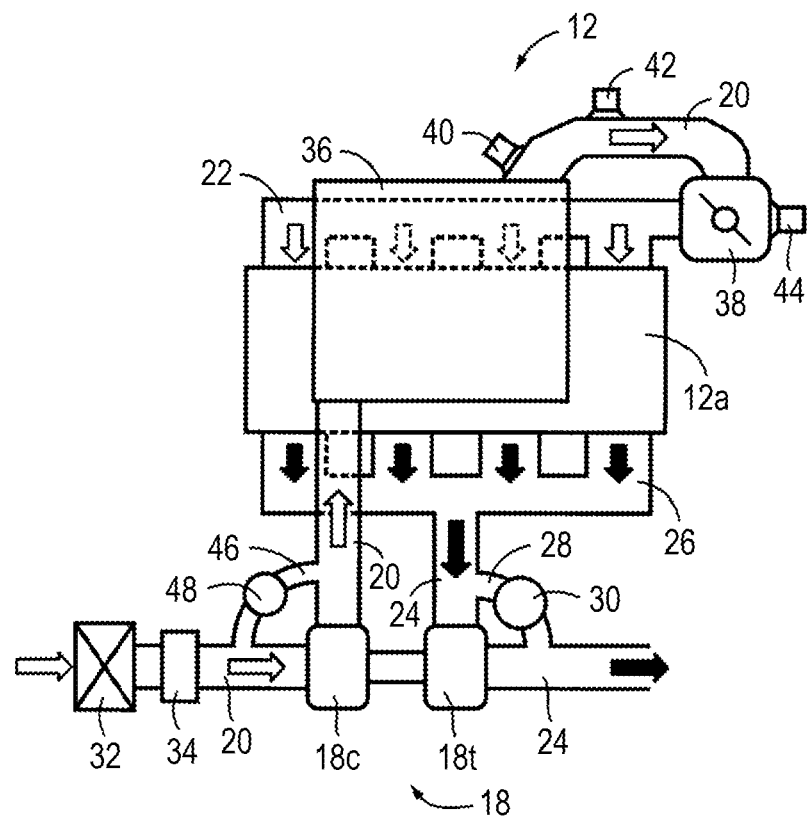
FIG. 2 is a diagram schematically illustrating a configuration of an engine illustrated in FIG. 1.

FIG. 2 is a diagram schematically illustrating a configuration of the engine 12. The engine 12 is a drive power source for travel of the vehicle 10 and is a known internal combustion engine such as a gasoline engine or a diesel engine including a supercharger 18, that is, an engine with the supercharger 18. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust-turbine supercharger, that is, a turbocharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t. The compressor 18c is rotationally driven by the turbine 18t to compress air suctioned into the engine 12, that is, intake air.

An exhaust bypass 28 that causes exhaust gas to flow from upstream to downstream with respect to the turbine 18t by bypassing the turbine 18t is provided in the exhaust pipe 24. A waste gate valve 30 (hereinafter referred to as "WGV 30") that continuously controls a ratio of exhaust gas passing through the exhaust bypass 28 to exhaust gas passing through the turbine 18t is provided in the exhaust bypass 28. A valve opening of the WGV 30 is continuously adjusted by causing the electronic control unit 100 which will be described later to operate an actuator which is not illustrated. As the valve opening of the WGV 30 increases, exhaust gas of the engine 12 is more likely to be discharged via the exhaust bypass 28. Accordingly, in a supercharged state of the engine 12 in which a supercharging operation of the supercharger 18 works, a supercharging pressure Pchg [Pa] from the supercharger 18 decreases as the valve opening of the WGV 30 increases. The supercharging pressure Pchg from the supercharger 18 is a pressure of intake air and is an air pressure downstream from the compressor 18c in the intake pipe 20. A side on which the supercharging pressure Pchg is low is, for example, a side with a pressure of intake air in a non-supercharged state of the engine 12 in which the supercharging operation of the supercharger 18 does not work at all, that is, a side with a pressure of intake air in an engine without the supercharger 18.

An air cleaner 32 is provided in an inlet of the intake pipe 20, and an air flowmeter 34 that measures an amount of intake air of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening and closing are controlled by causing an electronic control unit 100 which will be described later to operate a throttle actuator which is not illustrated is provided in the intake pipe 20 downstream from the intercooler 36 and upstream from the intake manifold 22. A supercharging pressure sensor 40 that detects a supercharging pressure Pchg from the supercharger 18 and an intake air temperature sensor 42 that detects an intake air temperature which is the temperature of intake air are provided in the intake pipe 20 between the intercooler 36 and the electronic throttle valve 38. A throttle valve opening sensor 44 that detects a throttle valve opening θth [%] which is an opening of the electronic throttle valve 38 is provided in the vicinity of the electronic throttle valve 38, for example, in the throttle actuator.

An air recirculation bypass 46 that causes air to flow again from downstream to upstream with respect to the compressor 18c by bypassing the compressor 18c is provided in the intake pipe 20. For example, an air bypass valve 48 that is opened to curb occurrence of a surge and to protect the compressor 18c at the time of sudden closing of the electronic throttle valve 38 is provided in the air recirculation bypass 46.

In the engine 12, an engine torque Te [Nm] which is an output torque of the engine 12 is controlled by causing the electronic control unit 100 which will be described later to control an engine control device 50 (see FIG. 1) including, for example, the electronic throttle valve 38, a fuel injection device, an ignition device, and the WGV 30.

Referring back to FIG. 1, the first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as drive power sources for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg [Nm] which is an output torque of the first rotary machine MG1 and an MG2 torque Tm [Nm] which is an output torque of the second rotary machine MG2 are controlled by causing the electronic control unit 100 which will be described later to control the inverter 52. For example, in the case of forward rotation, an output torque of each rotary machine is a powering torque which is a positive torque on an acceleration side and is a regenerative torque which is a negative torque on a deceleration side. The battery 54 is a power storage device that transmits and receives electric power to and from the first rotary machine MG1 and the second rotary machine MG2. The first rotary machine MG1 and the second rotary machine MG2 are provided in a case 56 which is a non-rotary member attached to the vehicle body.

The power transmission device 14 includes a gear shifting unit 58, a differential unit 60, a driven gear 62, a driven shaft 64, a final gear 66, a differential gear 68, and a reduction gear 70 in the case 56. The gear shifting unit 58 and the differential unit 60 are arranged coaxially with an input shaft 72 which is an input rotary member of the gear shifting unit 58. The gear shifting unit 58 is connected to the engine 12 via the input shaft 72 or the like. The differential unit 60 is connected in series to the gear shifting unit 58. The driven gear 62 engages with a drive gear 74 which is an output rotary member of the differential unit 60. The driven shaft 64 fixes the driven gear 62 and the final gear 66 such that they cannot rotate relative to each other. The final gear 66 has a smaller diameter than the driven gear 62. The differential gear 68 engages with the final gear 66 via a differential ring gear 68a. The reduction gear 70 has a smaller diameter than the driven gear 62 and engages with the driven gear 62. A rotor shaft 76 of the second rotary machine MG2 which is disposed in parallel to the input shaft 72 is connected to the reduction gear 70 separately from the input shaft 72 and is connected to the second rotary machine MG2 in a power-transmittable manner. The power transmission device 14 includes an axle 78 that is connected to the differential gear 68.

The power transmission device 14 having this configuration is suitably used for a vehicle of a front-engine front-drive (FF) type or a rear-engine rear-drive (RR) type. In the power transmission device 14, power which is output from the engine 12, the first rotary machine MG1, and the second rotary machine MG2 is transmitted to the driven gear 62. The power transmitted to the driven gear 62 is transmitted to the driving wheels 16 sequentially via the final gear 66, the differential gear 68, the axle 78, and the like. In this way, the second rotary machine MG2 is connected to the driving wheels 16 in a power-transmittable manner. In the power transmission device 14, the gear shifting unit 58, the differential unit 60, the driven gear 62, the driven shaft 64, the final gear 66, the differential gear 68, and the axle 78 constitute a power transmission path PT which is provided between the engine 12 and the driving wheels 16.

The gear shifting unit 58 includes a first planetary gear mechanism 80, a clutch C1, and a brake B1. The first planetary gear mechanism 80 is a known single-pinion type planetary gear device including a sun gear S0, a carrier CA0, and a ring gear R0. The differential unit 60 includes a second planetary gear mechanism 82. The second planetary gear mechanism 82 is a known single-pinion type planetary gear device including a sun gear S1, a carrier CA, and a ring gear R1.

The clutch C1 and the brake B1 are hydraulic frictional engagement devices including a multi-disc or single-disc clutch or brake which is pressed by a hydraulic actuator or a band brake which is tightened by a hydraulic actuator. In the clutch C1 and the brake B1, operating states such as an engaged state and a disengaged state are switched based on regulated hydraulic pressures which are output from a hydraulic pressure control circuit 84 provided in the vehicle 10 by causing the electronic control unit 100 which will be described later to control the hydraulic pressure control circuit 84.

The first planetary gear mechanism 80, the second planetary gear mechanism 82, the clutch C1, and the brake B1 are connected to each other as illustrated in FIG. 1.

In a state in which both the clutch C1 and the brake B1 are disengaged, a differential operation of the first planetary gear mechanism 80 is permitted. In this state, since a reaction torque of the engine torque Te does not appear in the sun gear S0, the gear shifting unit 58 is in a neutral state in which mechanical power transmission is not possible, that is, a neutral state. In a state in which the clutch C1 is engaged and the brake B1 is disengaged, the rotary elements of the first planetary gear mechanism 80 rotate integrally. In this state, rotation of the engine 12 is transmitted from the ring gear R0 to the carrier CA at a constant speed. On the other hand, in a state in which the clutch C1 is disengaged and the brake B1 is engaged, rotation of the sun gear S0 of the first planetary gear mechanism 80 is prohibited and rotation of the ring gear R0 is increased to be higher than rotation of the carrier CA0. In this state, rotation of the engine 12 is increased and output from the ring gear R0.

In this way, the gear shifting unit 58 serves as a two-stage stepped transmission which can be switched, for example, between a low gear stage in a directly coupled state with a gear ratio of "1.0" and a high gear stage in an overdrive state with a gear ratio of "0.7." In a state in which both the clutch C1 and the brake B1 are engaged, rotation of the rotary elements of the first planetary gear mechanism 80 is prohibited. In this state, rotation of the ring gear R0 which is an output rotary member of the gear shifting unit 58 is stopped and thus rotation of the carrier CAT which is an input rotary member of the differential unit 60 is stopped.

In the second planetary gear mechanism 82, the carrier CAT is a rotary element that is connected to the ring gear R0 which is an output rotary member of the gear shifting unit 58 and serves as an input rotary member of the differential unit 60. The sun gear ST is a rotary element that is integrally connected to the rotor shaft 86 of the first rotary machine MG1 and is connected to the first rotary machine MG1 in a power-transmittable manner. The ring gear R1 is a rotary element that is integrally connected to the drive gear 74 and is connected to the driving wheels 16 in a power-transmittable manner and serves as an output rotary member of the differential unit 60.

The second planetary gear mechanism 82 is a power split mechanism that mechanically splits power of the engine 12 which is input to the carrier CAT via the gear shifting unit 58 to the first rotary machine MG1 and the drive gear 74. That is, the second planetary gear mechanism 82 is a differential mechanism that splits and transmits the power of the engine 12 to the driving wheels 16 and the first rotary machine MG1. In the second planetary gear mechanism 82, the carrier CA serves as an input element, the sun gear S1 serves as a reaction element, and the ring gear R1 serves as an output element. The differential unit 60 constitutes an electrical gear shifting mechanism, for example, an electrical stepless transmission, in which a differential state of the second planetary gear mechanism 82 (that is, a differential state of the differential unit 60) is controlled by controlling the operating state of the first rotary machine MG1 that is connected to the second planetary gear mechanism 82 in a power-transmittable manner. The differential unit 60 which is a stepless transmission is provided in the power transmission path PT. The first rotary machine MG1 is a rotary machine to which the power of the engine 12 is transmitted.

Since the gear shifting unit 58 is in an overdrive state, an increase in torque of the first rotary machine MG1 is curbed. The differential unit 60 corresponds to a "stepless transmission" in the present disclosure.

Figure 3:
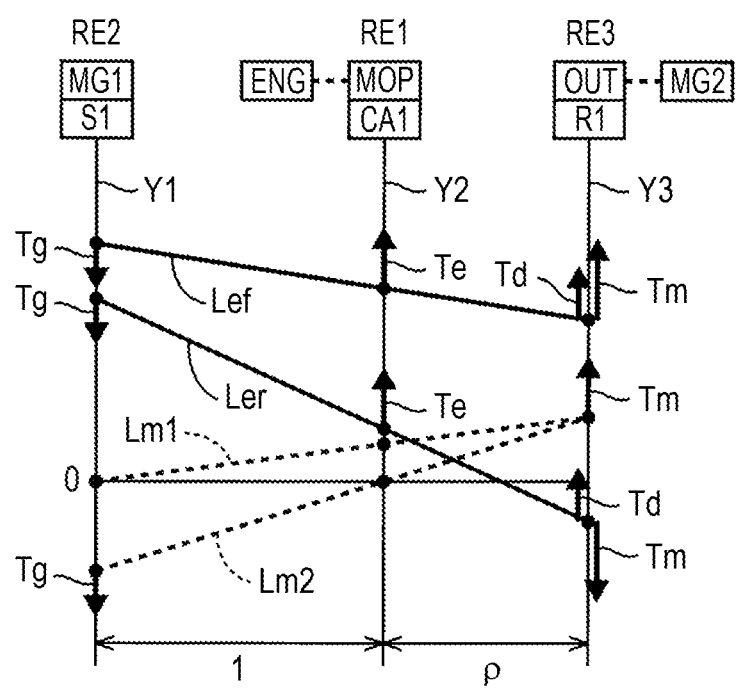
FIG. 3 is a collinear diagram illustrating a relative relationship between rotation speeds of rotary elements in a differential unit illustrated in FIG. 1.

FIG. 3 is a collinear diagram illustrating relative relationships between rotation speeds of the rotary elements in the differential unit 60 illustrated in FIG. 1. In FIG. 3, three vertical lines Y1, Y2, and Y3 correspond to three rotary elements of the second planetary gear mechanism 82 constituting the differential unit 60. The vertical line Y1 represents the rotation speed of the sun gear S which is a second rotary element RE2 connected to the first rotary machine MG1 (see "MG1" in FIG. 3). The vertical line Y2 represents the rotation speed of the carrier CAT which is a first rotary element RE connected to the engine 12 (see "ENG" in FIG. 3) via the gear shifting unit 58. The vertical line Y3 represents the rotation speed of the ring gear R1 which is a third rotary element RE3 integrally connected to the drive gear 74 (see "OUT" in FIG. 3). The second rotary machine MG2 (see "MG2" in FIG. 3) is connected to the driven gear 62 engaging with the drive gear 74 via the reduction gear 70 or the like. The gaps between the vertical lines Y1, Y2, and Y3 are determined according to a gear ratio ρ (=number of teeth of the sun gear S1/number of teeth of the ring gear R1) of the second planetary gear mechanism 82. In the relationship between the vertical axes in the collinear diagram, when the gap between the sun gear S1 and the carrier CAT corresponds to "1," the gap between the carrier CAT and the ring gear R1 corresponds to the gear ratio ρ.

A mechanical oil pump (see "MOP" in FIG. 3) which is provided in the vehicle 10 is connected to the carrier CA. This mechanical oil pump is operated with rotation of the carrier CAT to supply oil which is used for engaging operations of the clutch C1 and the brake B1, lubrication of the parts, and cooling of the parts. When rotation of the carrier CAT is stopped, the oil is supplied by an electrical oil pump (not illustrated) which is provided in the vehicle 10.

A solid line Lef in FIG. 3 denotes an example of relative speeds of the rotary elements at the time of forward travel in an HV travel mode which is a travel mode in which HV travel (hybrid travel) using at least the engine 12 as a drive power source is possible. A solid line Ler in FIG. 3 denotes an example of relative speeds of the rotary elements at the time of reverse travel in the HV travel mode.

In the HV travel mode, in the second planetary gear mechanism 82, for example, when an MG1 torque Tg which is a reaction torque and a negative torque of the first rotary machine MG1 with respect to an engine torque Te that is a positive torque which is input to the carrier CAT via the gear shifting unit 58 is input to the sun gear S1, a direct engine-transmitted torque Td [Nm] which is a positive torque appears in the ring gear R1. For example, when the MG1 torque Tg (=−ρ/(1+ρ)×Te) which is a reaction torque with respect to the engine torque Te which is input to the carrier CA is input to the sun gear S in a state in which the clutch C1 is engaged, the brake B1 is disengaged, and the gear shifting unit 58 is in a directly coupled state with a gear ratio of "1.0," the direct engine-transmitted torque Td (=Te/(1+ρ)=−(1/ρ)×Tg) appears in the ring gear R1. A combined torque of the direct engine-transmitted torque Td and the MG2 torque Tm which are transmitted to the driven gear 62 can be transmitted as a drive torque Tw [Nm] of the vehicle 10 to the driving wheels 16 according to required drive power Pwdem [N].

The first rotary machine MG1 serves as a power generator when a negative torque is generated at the time of forward rotation. Generated electric power Wg [W] of the first rotary machine MG1 is charged in the battery 54 or is consumed in the second rotary machine MG2. The second rotary machine MG2 outputs the MG2 torque Tm using all or some of the generated electric power Wg or electric power from the battery 54 in addition to the generated electric power Wg. The MG2 torque Tm at the time of forward travel is a powering torque which is a positive torque at the time of forward rotation, and the MG2 torque Tm at the time of reverse travel is a powering torque which is a negative torque at the time of reverse rotation.

The differential unit 60 can operate as an electrical stepless transmission. For example, in the HV travel mode, when the rotation speed of the first rotary machine MG1, that is, the rotation speed of the sun gear S, increases or decreases with respect to an output rotation speed No [rpm] which is the rotation speed of the drive gear 74 which is constrained on rotation of the driving wheels 16 by controlling the operating state of the first rotary machine MG1, the rotation speed of the carrier CA1 increases or decreases. Since the carrier CA1 is connected to the engine 12 via the gear shifting unit 58, an engine rotation speed Ne which is the rotation speed of the engine 12 increases or decreases with the increase or decrease in the rotation speed of the carrier CA1. Accordingly, in the HV travel, it is possible to perform control such that an engine operating point OPeng is set to an efficient operating point. This hybrid type is referred to as a mechanical split type or a split type. The first rotary machine MG1 is a rotary machine that can control the engine rotation speed Ne. The engine operating point OPeng is an operation point of the engine 12 which is expressed by the engine rotation speed Ne and the engine torque Te.

A dotted line Lm1 in FIG. 3 represents an example of relative speeds of the rotary elements at the time of forward travel in a single-motor-driven EV travel mode in which EV travel (motor-driven travel) using only the second rotary machine MG2 as a drive power source in a state in which the operation of the engine 12 is stopped is possible. In the single-motor-driven EV travel mode, when both the clutch C1 and the brake B1 are disengaged and the gear shifting unit 58 is put into a neutral state, the differential unit 60 is also put into a neutral state. In this state, the MG2 torque Tm can be transmitted as a drive torque Tw of the vehicle 10 to the driving wheels 16. In the single-motor-driven EV travel mode, for example, the first rotary machine MG1 is maintained at zero rotation in order to decrease a drag loss in the first rotary machine MG1. For example, even when control for maintaining the first rotary machine MG1 at zero rotation is performed, the differential unit 60 is in the neutral state and thus the drive torque Tw is not affected.

A dotted line Lm2 in FIG. 3 represents an example of relative speeds of the rotary elements at the time of forward travel in a double-motor-driven EV travel mode in which EV travel using both the first rotary machine MG1 and the second rotary machine MG2 as drive power sources in a state in which the operation of the engine 12 is stopped is possible. In the double-motor-driven EV travel mode, when both the clutch C1 and the brake B1 are engaged and rotation of the rotary elements of the first planetary gear mechanism 80 is prohibited, the carrier CAT is stopped at zero rotation. In this state, the MG1 torque Tg and the MG2 torque Tm can be transmitted as the drive torque Tw of the vehicle 10 to the driving wheels 16.

Figure 4:
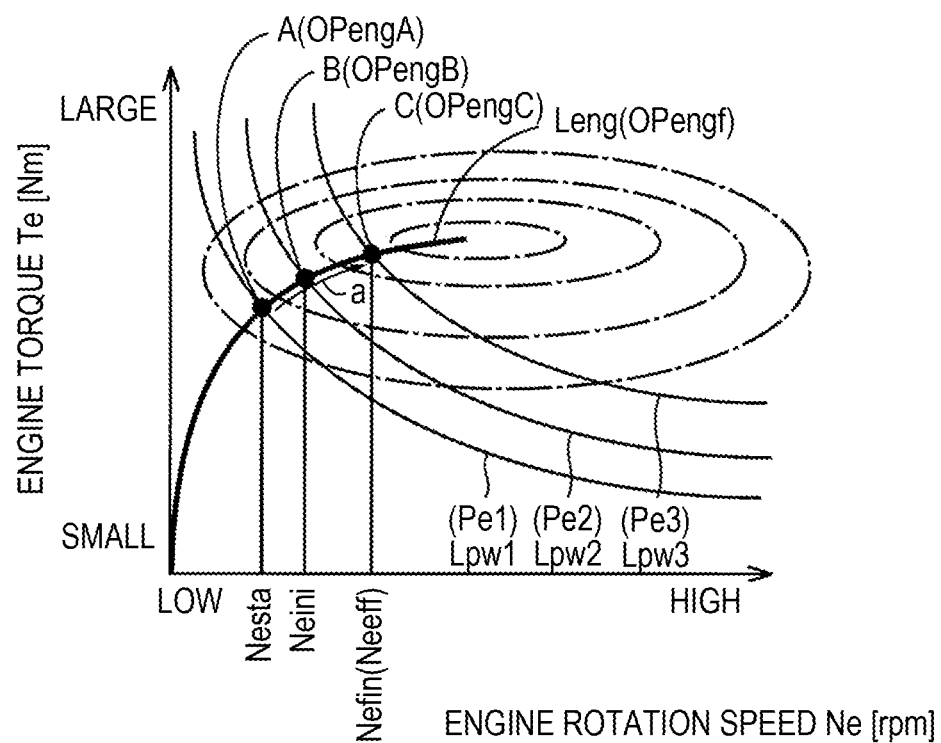
FIG. 4 is a diagram illustrating an example of an optimal engine operating point in a two-dimensional coordinate system with an engine rotation speed and an engine torque as variables.

FIG. 4 is a diagram illustrating an example of optimal engine operating points OPengf in a two-dimensional coordinate system with the engine rotation speed Ne and the engine torque Te as variables. In FIG. 4, a maximum efficiency line Leng denotes a group of optimal engine operating points OPengf. An optimal engine operating point OPengf is predetermined as an engine operating point OPeng at which total fuel efficiency in the vehicle 10 is the best in consideration of charging/discharging efficiency in the battery 54 in addition to fuel efficiency of the engine 12 alone, for example, when required engine power Pedem [W] is realized. That is, the engine rotation speed Ne at an optimal engine operating point OPengf is an optimal fuel-efficiency rotation speed Neeff at which the engine 12 can most efficiently output the required engine power Pedem.

Equi-engine-power lines Lpw1, Lpw2, and Lpw3 denote examples in which the required engine power Pedem is engine power Pe1, Pe2, and Pe3, respectively. A point A is an engine operating point OPengA when the engine power Pe1 is realized at the optimal engine operating point OPengf, a point B is an engine operating point OPengB when the engine power Pe2 is realized at the optimal engine operating point OPengf, and a point C is an engine operating point OPengC when the engine power Pe3 is realized at the optimal engine operating point OPengf. The points A, B, and C are also target values of the engine operating point OPeng which is expressed by a target engine rotation speed Netgt [rpm] and a target engine torque Tetgt [Nm], that is, a target engine operating point OPengtgt. That is, the target engine rotation speed Netgt is a target value of the engine rotation speed Ne and the target engine torque Tetgt is a target value of the engine torque Te.

For example, when the target engine operating point OPengtgt changes from the point A to the point C with an increase in an accelerator opening θacc [%] (for example, an increase in the accelerator opening θacc based on an operation of a driver increasing a force of depression of an accelerator pedal, which is not illustrated), the engine operating point OPeng changes on a path a which passes over the maximum efficiency line Leng. The target engine rotation speed Netgt corresponds to a "target value" in the present disclosure.

Although not illustrated in FIG. 4, the optimal engine operating points OPengf at which the fuel efficiency is the highest in the engine 12 with the supercharger 18 are stored in advance with a supercharging pressure Pchg in addition to the engine rotation speed Ne and the engine torque Te as variables. The supercharging pressure Pchg when the required engine power Pedem is realized at the optimal engine operating points OPengf is a target supercharging pressure Pchgtgt [Pa].

Figure 5:
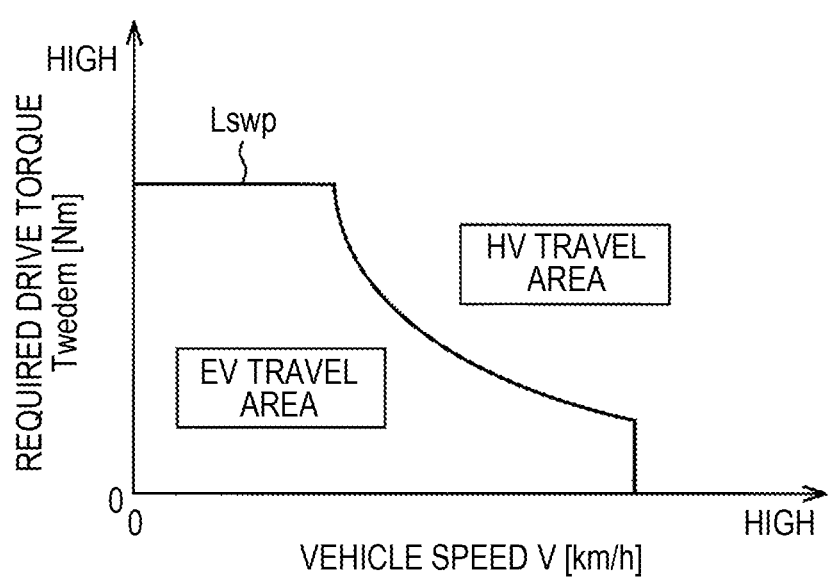
FIG. 5 is a diagram illustrating an example of a drive power source switching map which is used for switching control between EV travel and HV travel.

FIG. 5 is a diagram illustrating an example of a drive power source switching map which is used for switching control between EV travel and HV travel. In FIG. 5, a solid line Lswp is a boundary line between an EV travel area and an HV travel area at which switching between the EV travel and the HV travel is performed. An area in which a vehicle speed V [km/h] is relatively low and a required drive torque Twdem [Nm] is relatively low (that is, required drive power Pwdem is relatively small) is defined in advance in the EV travel area. An area in which the vehicle speed V is relatively high and the required drive torque Twdem is relatively high (that is, the required drive power Pwdem is relatively great) is defined in advance in the HV travel area. When a state of charge value SOC [%] of the battery 54 which will be described later is less than a predetermined value or when warming-up of the engine 12 is necessary, the EV travel area in FIG. 5 may be changed to the HV travel area. The predetermined value is a predetermined threshold value for determining that the state of charge value SOC is a value at which the engine 12 needs to be forcibly started to charge the battery 54.

FIG. 6 is an engagement operation table illustrating a relationship between travel modes and combinations of operating states of the clutch C1 and the brake B1 in the travel modes. In FIG. 6, "O" denotes an engaged state, a blank denotes a disengaged state, and "A" denotes that one of the clutch C1 and the brake B1 is engaged at the time of additional use of an engine brake for switching the engine 12 in a rotation-stopped state to a corotating state. "G" denotes that the first rotary machine MG1 serves mainly as a generator, and "M" denotes that the first rotary machine MG1 and the second rotary machine MG2 serve mainly as a motor at the time of driving and serve mainly as a generator at the time of regeneration. The vehicle 10 can selectively realize the EV travel mode and the HV travel mode as travel modes. The EV travel mode has two modes including the single-motor-driven EV travel mode and the double-motor-driven EV travel mode.

The single-motor-driven EV travel mode is realized in a state in which both the clutch C1 and the brake B1 are disengaged. In the single-motor-driven EV travel mode, the clutch C1 and the brake B1 are disengaged and thus the gear shifting unit 58 is put into a neutral state. When the gear shifting unit 58 is put into the neutral state, the differential unit 60 is put into a neutral state in which a reaction torque of the MG1 torque Tg does not appear in the carrier CA1 connected to the ring gear R0. In this state, the electronic control unit 100 causes the second rotary machine MG2 to output the MG2 torque Tm for travel (see a dotted line Lm1 in FIG. 3). In the single-motor-driven EV travel mode, reverse travel may be performed by rotating the second rotary machine MG2 opposite to the rotating direction at the time of forward travel.

In the single-motor-driven EV travel mode, since the ring gear R0 is corotated with the carrier CA1 but the gear shifting unit 58 is in the neutral state, the engine 12 is not corotated but is stopped at zero rotation. Accordingly, when regeneration control is performed in the second rotary machine MG2 during travel in the single-motor-driven EV travel mode, a large amount of regeneration is possible. When the battery 54 is fully charged and regenerative energy does not appear during travel in the single-motor-driven EV travel mode, additional use of the engine brake can be considered. When the engine brake is used together, the brake B1 or the clutch C1 is engaged (see "use of engine brake together" in FIG. 6). When the brake B1 or the clutch C1 is engaged, the engine 12 is corotated and the engine brake operates.

The double-motor-driven EV travel mode is realized in a state in which both the clutch C1 and the brake B1 are engaged. In the double-motor-driven EV travel mode, since the clutch C1 and the brake B1 are engaged, rotation of the rotary elements of the first planetary gear mechanism 80 is stopped, the engine 12 is stopped at zero rotation, and rotation of the carrier CA1 connected to the ring gear R0 is stopped. When rotation of the carrier CA1 is stopped, a reaction torque of the MG1 torque Tg appears in the carrier CA, and thus the MG1 torque Tg can be mechanically output from the ring gear R1 and transmitted to the driving wheels 16. In this state, the electronic control unit 100 causes the first rotary machine MG1 and the second rotary machine MG2 to output the MG1 torque Tg and the MG2 torque Tm for travel (see the dotted line Lm2 in FIG. 3). In the double-motor-driven EV travel mode, both the first rotary machine MG1 and the second rotary machine MG2 can be rotated opposite to the rotating direction at the time of forward travel to allow reverse travel.

A low state of the HV travel mode is realized in a state in which the clutch C1 is engaged and the brake B1 is disengaged. In the low state of the HV travel mode, since the clutch C1 is engaged, the rotary elements of the first planetary gear mechanism 80 are integrally rotated and the gear shifting unit 58 is put into a directly coupled state. Accordingly, rotation of the engine 12 is transmitted from the ring gear R0 to the carrier CA at a constant speed. A high state of the HV travel mode is realized in a state in which the brake B1 is engaged and the clutch C1 is disengaged. In the high state of the HV travel mode, since the brake B1 is engaged, rotation of the sun gear S0 is stopped and the gear shifting unit 58 is put into an overdrive state. Accordingly, rotation of the engine 12 increases and is transmitted from the ring gear R0 to the carrier CA1. In the HV travel mode, the electronic control unit 100 causes the first rotary machine MG to output the MG torque Tg which is a reaction torque of the engine torque Te by power generation and causes the second rotary machine MG2 to output the MG2 torque Tm by the generated electric power Wg of the first rotary machine MG1 (see a solid line Lef in FIG. 3). In the HV travel mode, for example, in the low state of the HV travel mode, the second rotary machine MG2 can also be rotated opposite to the rotating direction at the time of forward travel to allow reverse travel (see a solid line Ler in FIG. 3). In the HV travel mode, the vehicle can travel additionally using the MG2 torque Tm based on electric power from the battery 54. In the HV travel mode, for example, when the vehicle speed V is relatively high and the required drive torque Twdem is relatively small, the high state of the HV travel mode is set up.

Referring back to FIG. 1, the vehicle 10 further includes the electronic control unit 100 serving as a controller including a control device for the vehicle 10 associated with control of the engine 12, the first rotary machine MG, the second rotary machine MG2, and the like. For example, the electronic control unit 100 is configured to include a so-called microcomputer including a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity. The electronic control unit 100 corresponds to a "control device" in the present disclosure.

The electronic control unit 100 is supplied with various signals (for example, a supercharging pressure Pchg, a throttle valve opening θth, an engine rotation speed Ne, an output rotation speed No corresponding to a vehicle speed V, an MG1 rotation speed Ng [rpm] which is the rotation speed of the first rotary machine MG1, an MG2 rotation speed Nm [rpm] which is the rotation speed of the second rotary machine MG2, an accelerator opening θacc which is an accelerator operation amount from a driver indicating the magnitude of the driver's acceleration operation, and a battery temperature THbat [° C.], a battery charging/discharging current Ibat [mA], and a battery voltage Vbat [V] of the battery 54) based on detection values from various sensors (for example, a supercharging pressure sensor 40, a throttle valve opening sensor 44, an engine rotation speed sensor 88, an output rotation speed sensor 90, an MG1 rotation speed sensor 92, an MG2 rotation speed sensor 94, an accelerator opening sensor 96, and a battery sensor 98) which are provided in the vehicle 10.

The electronic control unit 100 outputs various command signals (for example, an engine control command signal Se for controlling the engine 12, a rotary machine control command signal Sing for controlling the first rotary machine MG1 and the second rotary machine MG2, and a hydraulic pressure control command signal Sp for controlling the operating states of the clutch C1 and the brake B1) to various devices (for example, the engine control device 50, the inverter 52, and the hydraulic pressure control circuit 84) which are provided in the vehicle 10.

The electronic control unit 100 calculates a state of charge value SOC which is a value indicating the state of charge of the battery 54, for example, based on the battery charging/discharging current Ibat and the battery voltage Vbat. The electronic control unit 100 calculates chargeable electric power Win [W] and dischargeable electric power Wout [W] for defining a feasible range of battery power Pbat [W] which is the power of the battery 54, for example, based on the battery temperature THbat and the state of charge value SOC of the battery 54. The chargeable electric power Win is possible input power for defining a limitation of input electric power of the battery 54 and the dischargeable electric power Wout is possible output power for defining a limitation of output electric power of the battery 54. For example, the chargeable electric power Win and the dischargeable electric power Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in a normal area. For example, the chargeable electric power Win decreases as the state of charge value SOC increases in an area in which the state of charge value SOC is high. For example, the dischargeable electric power Wout decreases as the state of charge value SOC decreases in an area in which the state of charge value SOC is low.

The electronic control unit 100 includes an acceleration request determining unit 102, a supercharging execution determining unit 104, and a drive control unit 106.

The acceleration request determining unit 102 determines whether there is an acceleration request. Whether there is an acceleration request is determined, for example, based on whether the required drive torque Twdem is increased by an operation of a driver increasing a force of depression of an accelerator pedal. When the required drive torque Twdem is increased, it is determined that there is an acceleration request. For example, by applying the actual accelerator opening θacc and the actual vehicle speed V to a relationship between the accelerator opening θacc and the vehicle speed V and the required drive torque Twdem (for example, a drive power map) which is calculated and stored in advance (that is, predetermined) by experiment or by design, the required drive torque Twdem which is a drive torque Tw required for the vehicle 10 is calculated. In other words, the required drive torque Twdem is required drive power Pwdem at the vehicle speed V. The output rotation speed No or the like may be applied to the drive power map instead of the vehicle speed V.

The supercharging execution determining unit 104 determines whether supercharging in the engine 12 is to be performed when the acceleration request determining unit 102 determines that there is an acceleration request. For example, when a target supercharging pressure Pchgtgt at a target engine operating point OPengtgt which is set based on the accelerator opening θacc after a driver has performed an operation of increasing a force of depression of an accelerator pedal is a value with which a supercharging operation of the supercharger 18 works, the supercharging execution determining unit 104 determines that supercharging in the engine 12 is to be performed, and the supercharging execution determining unit 104 determines that supercharging in the engine 12 is not to be performed otherwise. The target supercharging pressure Pchgtgt is a target supercharging pressure Pchgtgt at the time of starting of control for producing an acceleration feeling (which will be described later) which is performed in response to an acceleration request, that is, a supercharging pressure Pchg at the time of ending of the control for producing the acceleration feeling.

The drive control unit 106 performs the control for producing the acceleration feeling and output compensation control when the acceleration request determining unit 102 determines that there is an acceleration request.

A method of setting a target engine operating point OPengtgt in the control for producing the acceleration feeling when the target engine operating point OPengtgt changes from a point A to a point C in FIG. 4 will be described below.

Here, the required engine power Pedem immediately before the control for producing the acceleration feeling is started is referred to as starting required engine power Pesta [W] and the required engine power Pedem at the time of ending of the control for producing the acceleration feeling is referred to as final required engine power Pefin [W]. In other words, the starting required engine power Pesta is engine power Pe which is required for the vehicle 10 immediately before an acceleration request is issued, and the final required engine power Pefin is engine power Pe which is required for the vehicle 10 in response to the acceleration request. In this example, the starting required engine power Pesta is engine power Pe1 and the final required engine power Pefin is engine power Pe3.

The target engine operating point OPengtgt immediately before the control for producing the acceleration feeling is started is referred to as a starting operating point OPengsta, and the target engine rotation speed Netgt at the starting operating point OPengsta is referred to as a starting rotation speed Nesta [rpm]. In this example, the starting operating point OPengsta is an engine operating point OPengA (point A).

The target engine operating point OPengtgt at the time of ending of the control for producing the acceleration feeling is referred to as a final operating point OPengfin, and the target engine rotation speed Netgt at the final operating point OPengfin is referred to as a final rotation speed Nefin [rpm]. The final rotation speed Nefin is an optimal-fuel-efficiency rotation speed Neeff [rpm] of the engine 12 for realizing the final required engine power Pefin. In this example, the final operating point OPengfin is an engine operating point OPengC (point C).

The target engine operating point OPengtgt immediately after the control for producing the acceleration feeling is started is referred to as an initial operating point OPengini, and the target engine rotation speed Netgt at the initial operating point OPengini is referred to as an initial rotation speed Neini [rpm]. In this example, the initial operating point OPengini is an engine operating point OPengB (point B). The initial rotation speed Neini is a rotation speed which is lower than the final rotation speed Nefin and higher than the starting rotation speed Nesta. That is, the initial rotation speed Neini is lower than the optimal-fuel-efficiency rotation speed Neeff at the final operating point OPengfin at which the engine 12 can most efficiently output the final required engine power Pefin (=Pe3). "Required engine power" in the present disclosure is the required engine power Pedem when there is an acceleration request, and is the final required engine power Pefin which is engine power Pe required for the vehicle 10 in response to the acceleration request in this example.

The drive control unit 106 sets the target engine operating point OPengtgt to the initial operating point OPengini at the time of starting of the control for producing the acceleration feeling. Accordingly, the target engine operating point OPengtgt changes from the starting operating point OPengsta (point A) to the initial operating point OPengini (point B). The drive control unit 106 starts the control for producing the acceleration feeling such that the supercharging pressure Pchg of the engine 12 reaches the target supercharging pressure Pchgtgt at the time of starting of the control for producing the acceleration feeling. Thereafter, the drive control unit 106 increases the engine rotation speed Ne from the initial rotation speed Neini to the final rotation speed Nefin, that is, the optimal-fuel-efficiency rotation speed Neeff, at a preset rotation speed increase rate $\mu$ [rpm/ms] (see FIGS. 9A to 9C) with the elapse of time t [ms]. Accordingly, the target engine operating point OPengtgt changes gradually from the initial operating point OPengini (point B) to the final operating point OPengfin (point C). The elapse of time t refers to the elapse of time t from the starting time of the control for producing the acceleration feeling at which the target engine operating point OPengtgt changes to the initial operating point OPengini. The elapse of time t corresponds to the "elapse of time" in the present disclosure.

As the initial rotation speed Neini, the rotation speed increase rate $\mu$, and the lower-limit rotation speed Nemin [rpm] when the target supercharging pressure Pchgtgt does not have a value in which a supercharging operation works and the control for producing the acceleration feeling is performed, a basic initial value $I_0$, a basic increase rate $\mu_0$ [rpm/ms], and a basic lower limit $M_0$ [rpm] are acquired in advance by experiment or by design and are stored. The basic initial value $I_0$, the basic increase rate $\mu_0$, and the basic lower limit $M_0$ are set to values with which an output shortage of the engine power Pe for the final required engine power Pefin which is caused by the engine rotation speed Ne becoming less than the final rotation speed Nefin, that is, the optimal-fuel-efficiency rotation speed Neeff, when the control for producing the acceleration feeling is performed based thereon can be compensated for by the second rotary machine MG2.

The initial rotation speed Neini at the initial operating point OPengini is set to a sum of the basic initial value $I_0$ and an initial value correction value $\alpha$ [rpm]. In other words, for example, the optimal engine operating point OPengf for realizing the initial rotation speed Neini becomes the initial operating point OPengini. The rotation speed increase rate $\mu$ is set to a sum of the basic increase rate $\mu_0$ and an increase rate correction value $\beta$ [rpm/ms]. The lower-limit rotation speed Nemin is set to a sum of the basic lower limit $M_0$ and a lower limit correction value $\gamma$ [rpm]. In this way, the initial rotation speed Neini, the rotation speed increase rate $\mu$, and the lower-limit rotation speed Nemin can be corrected by the initial value correction value $\alpha$, the increase rate correction value $\beta$, and the lower limit correction value $\gamma$, respectively.

Figure 7A:
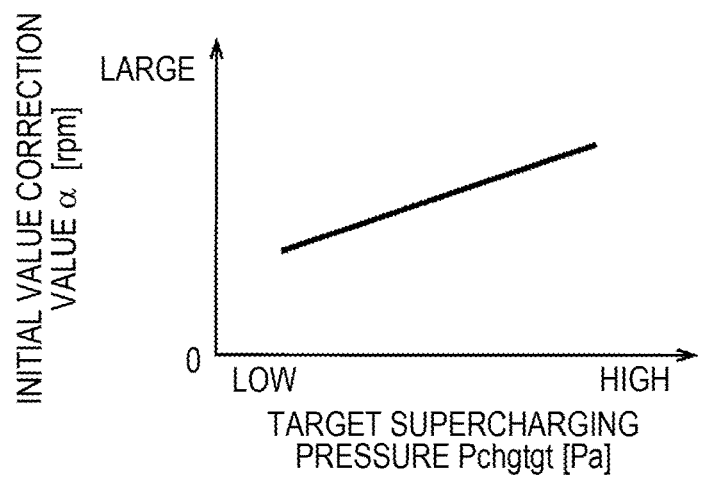
FIGS. 7A to 7C are diagrams illustrating relationships among an initial value correction value, an increase rate correction value, a lower limit correction value, and a target supercharging pressure, where
Figure 7B:
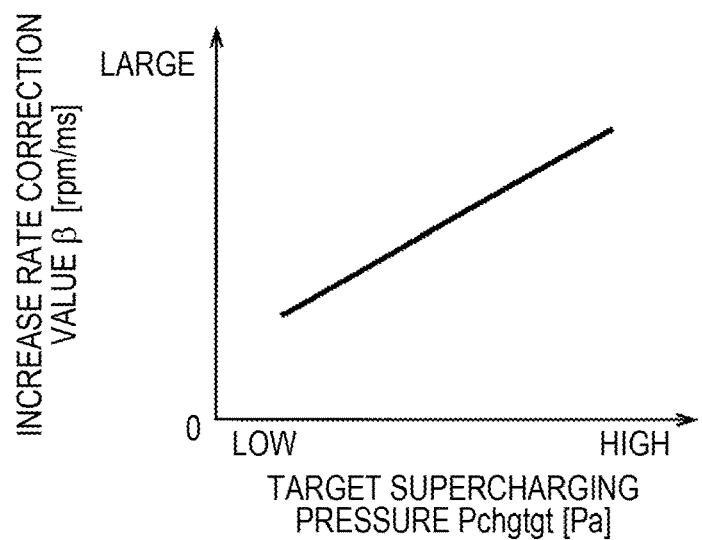
Figure 7C:
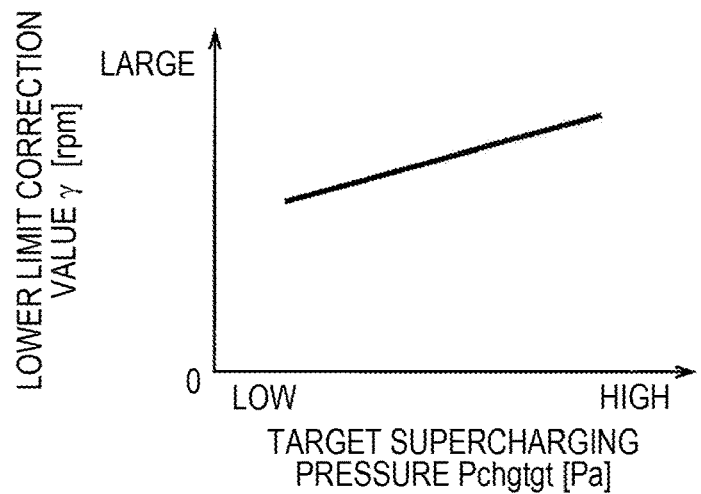

FIGS. 7A to 7C are diagrams illustrating relationships among the initial value correction value $\alpha$, the increase rate correction value $\beta$, and the lower limit correction value $\gamma$ and the target supercharging pressure Pchgtgt, where FIG. 7A illustrates a relationship between the target supercharging pressure Pchgtgt and the initial value correction value $\alpha$, FIG. 7B illustrates a relationship between the target supercharging pressure Pchgtgt and the increase rate correction value β, and FIG. 7C illustrates a relationship between the target supercharging pressure Pchgtgt and the lower limit correction value γ.

The drive control unit 106 sets the initial value correction value α (>0) based on the target supercharging pressure Pchgtgt of the engine 12 at the time of starting of control for producing an acceleration feeling. As illustrated in FIG. 7A, the initial value correction value α is set to a greater value when the target supercharging pressure Pchgtgt is high than when the target supercharging pressure Pchgtgt is low. The initial value correction value α is set to a greater value as the target supercharging pressure Pchgtgt becomes higher, that is, the initial value correction value α becomes greater as the target supercharging pressure Pchgtgt becomes greater. In the example illustrated in FIG. 7A, the initial value correction value α increases linearly with an increase in the target supercharging pressure Pchgtgt. By setting the initial value correction value α, the drive control unit 106 sets the initial rotation speed Neini in control for producing an acceleration feeling to a value $w(=I_0+\alpha)$ which is greater by the initial value correction value α than the basic initial value $I_0$.

The drive control unit 106 sets the increase rate correction value β (>0) based on the target supercharging pressure Pchgtgt of the engine 12 at the time of starting of control for producing an acceleration feeling. As illustrated in FIG. 7B, the increase rate correction value β is set to a greater value when the target supercharging pressure Pchgtgt is high than when the target supercharging pressure Pchgtgt is low. The increase rate correction value β is set to a greater value as the target supercharging pressure Pchgtgt becomes higher, that is, the increase rate correction value β becomes greater as the target supercharging pressure Pchgtgt becomes greater. In the example illustrated in FIG. 7B, the increase rate correction value β increases linearly with an increase in the target supercharging pressure Pchgtgt. By setting the increase rate correction value β, the drive control unit 106 sets the rotation speed increase rate μ of the engine rotation speed Ne in control for producing an acceleration feeling to a value $w(=\mu_0+\beta)$ which is greater by the increase rate correction value β than the basic increase rate $\mu_0$.

The drive control unit 106 sets the lower limit correction value γ (>0) based on the target supercharging pressure Pchgtgt of the engine 12 at the time of starting of control for producing an acceleration feeling. As illustrated in FIG. 7C, the lower limit correction value γ is set to a greater value when the target supercharging pressure Pchgtgt is high than when the target supercharging pressure Pchgtgt is low. The lower limit correction value γ is set to a greater value as the target supercharging pressure Pchgtgt becomes higher, that is, the lower limit correction value γ becomes greater as the target supercharging pressure Pchgtgt becomes greater. In the example illustrated in FIG. 7C, the lower limit correction value γ increases linearly with an increase in the target supercharging pressure Pchgtgt. Through this setting of the lower limit correction value γ, the drive control unit 106 sets the lower-limit rotation speed Nemin of a lower limit guard process in control for producing an acceleration feeling to a value $w(=M_0+\gamma)$ which is greater by the lower limit correction value γ than the basic lower limit $M_0$. The lower limit guard process is a process of setting the lower limit of the target engine rotation speed Netgt and, specifically, the target engine rotation speed Netgt is set not to be less than the lower-limit rotation speed Nemin.

Referring back to FIG. 1, the drive control unit 106 calculates the MG1 torque Tg, for example, in feedback control in which the first rotary machine MG1 operates such that the engine rotation speed Ne reaches the target engine rotation speed Netgt. The MG2 torque Tm is calculated, for example, such that the drive torque Tw corresponding to the direct engine-transmitted torque Td and the MG2 torque Tm are summed to acquire the required drive torque Twdem. That is, the drive control unit 106 controls the second rotary machine MG2 such that an output shortage of the engine power Pe [W] for the final required engine power Pefin which is caused by the engine rotation speed Ne becoming less than the final required rotation speed Nefin, that is, the optimal-fuel-efficiency rotation speed Neeff, by control for producing an acceleration feeling is compensated for. Specifically, the second rotary machine MG2 is controlled such that a shortage of the direct engine-transmitted torque Td due to the output shortage of the engine power Pe is compensated for by the MG2 torque Tm. Accordingly, drive power which is required by a driver is realized. Controlling of the second rotary machine MG2 such that the output shortage of the engine power Pe [W] for the final required engine power Pefin which is caused by the engine rotation speed Ne becoming less than the final required rotation speed Nefin by the control for producing an acceleration feeling is compensated for is output compensation control.

In this way, the vehicle 10 is a vehicle in which the MG1 torque Tg which is a reaction torque of the first rotary machine MG1 which is input to the sun gear S1 of the differential unit 60 is controlled such that the engine rotation speed Ne reaches the target engine rotation speed Netgt. By controlling the engine 12 and the differential unit 60 which is a stepless transmission, the engine rotation speed Ne reaches the target engine rotation speed Netgt.

In the control for producing an acceleration feeling, an output shortage of the engine power Pe is more likely to occur as the initial rotation speed Neini is set to be lower, and a period in which the output shortage of the engine power Pe occurs is more likely to extend as the rotation speed increase rate μ becomes less. In the engine 12 with the supercharger 18, the output shortage of the engine power Pe due to a response delay of the supercharging pressure Pchg is more likely to occur and the output shortage is more likely to increase, when the target supercharging pressure Pchgtgt at the time of acceleration of the vehicle is high than when the target supercharging pressure Pchgtgt at the time of acceleration of the vehicle is low.

Accordingly, when the initial rotation speed Neini is set to be lower in the control for producing an acceleration feeling and the target supercharging pressure Pchgtgt at the time of acceleration of the vehicle in the engine 12 with the supercharger 18 is high, the output shortage of the engine power Pe is likely to increase, compensation by the second rotary machine MG2 is not sufficient due to constraints on the battery 54 (for example, constraints by the dischargeable electric power Wout) even when it is intended to compensate for the output shortage, that is, the shortage of the direct engine-transmitted torque Td due to the output shortage of the engine power Pe is not sufficiently compensated for by the MG2 torque Tm which is the output torque of the second rotary machine MG2, and there is concern of a decrease in acceleration performance. Accordingly, in this example, the initial value correction value α, the increase rate correction value β, and the lower limit correction value γ are set based on the target supercharging pressure Pchgtgt of the engine 12 at the time of starting of the control for producing an acceleration feeling as described above.

Figure 8:
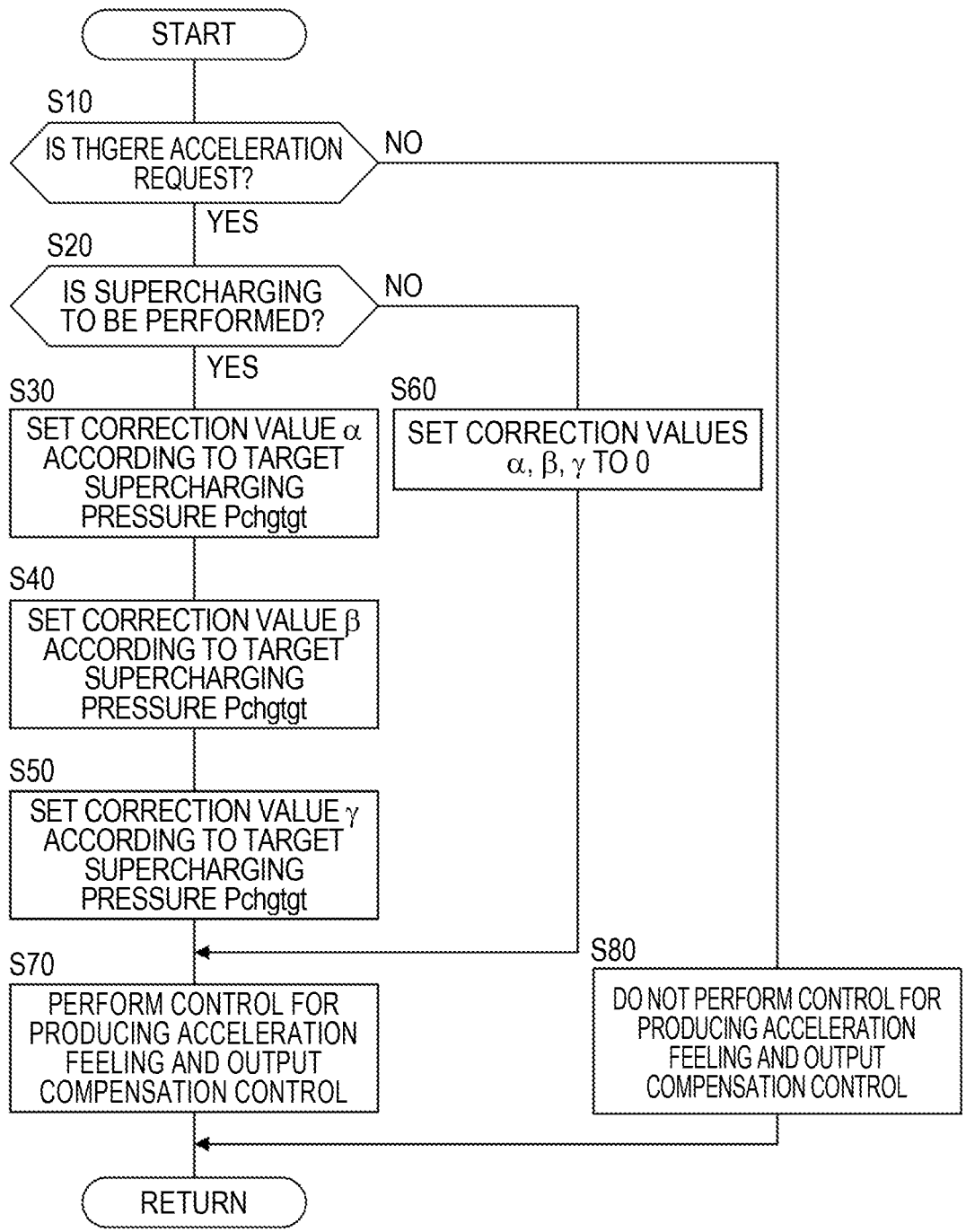
FIG. 8 is a diagram illustrating an example of a flowchart of a principal part of a control operation of the electronic control unit.

FIG. 8 is an example of a flowchart illustrating a principal part of the control operation of the electronic control unit

100. The flowchart illustrated in FIG. 8 is repeatedly performed when the vehicle 10 is in the HV travel mode.

First, in Step S10 corresponding to the function of the acceleration request determining unit 102, it is determined whether there is an acceleration request. When the determination result of Step S10 is positive, Step S20 is performed. When the determination result of Step S10 is negative, Step S80 is performed.

In Step S20 corresponding to the function of the supercharging execution determining unit 104, it is determined whether supercharging is to be performed. When the determination result of Step S20 is positive, Step S30 is performed. When the determination result of S20 is negative, Step S60 is performed.

In Step S30 corresponding to the function of the drive control unit 106, the initial value correction value α is set based on the target supercharging pressure Pchgtgt at the time of starting of the control for producing an acceleration feeling. Then, Step S40 is performed.

In Step S40 corresponding to the function of the drive control unit 106, the increase rate correction value β is set based on the target supercharging pressure Pchgtgt at the time of starting of the control for producing an acceleration feeling. Then, Step S50 is performed.

In Step S50 corresponding to the function of the drive control unit 106, the lower limit correction value γ is set based on the target supercharging pressure Pchgtgt at the time of starting of the control for producing an acceleration feeling. Then, Step S70 is performed.

The initial value correction value α which is set in Step S30, the increase rate correction value β which is set in Step S40, and the lower limit correction value γ which is set in Step S50 are set such that the output shortage of the engine power Pe due to a response delay of the supercharging pressure Pchg when the control for producing an acceleration feeling is performed is compensated for by the second rotary machine MG2.

In Step S60 corresponding to the function of the drive control unit 106, all of the initial value correction value α, the increase rate correction value β, and the lower limit correction value γ are set to zero. Then, Step S70 is performed.

In Step S70 corresponding to the function of the drive control unit 106, the control for producing an acceleration feeling and output compensation control are performed. In the control for producing an acceleration feeling and output compensation control, the MG1 torque Tg is calculated to achieve the target engine rotation speed Netgt, the MG2 torque Tm is calculated to compensate for the output shortage of the engine power Pe, and the engine 12, the first rotary machine MG1, and the second rotary machine MG2 are controlled. The engine 12 is controlled such that the supercharging pressure Pchg of the engine 12 reaches the target supercharging pressure Pchgtgt at the time of starting of the control for producing an acceleration feeling. Then, the flowchart is restarted.

In Step S80 corresponding to the function of the drive control unit 106, none of the control for producing an acceleration feeling and output compensation control are performed. For example, when the vehicle 10 is decelerating, the engine rotation speed Ne for realizing the required engine power Pedem during deceleration is set as the target engine rotation speed Netgt on the optimal engine operating point OPengf. Then, the flowchart is restarted.

Figure 9A:
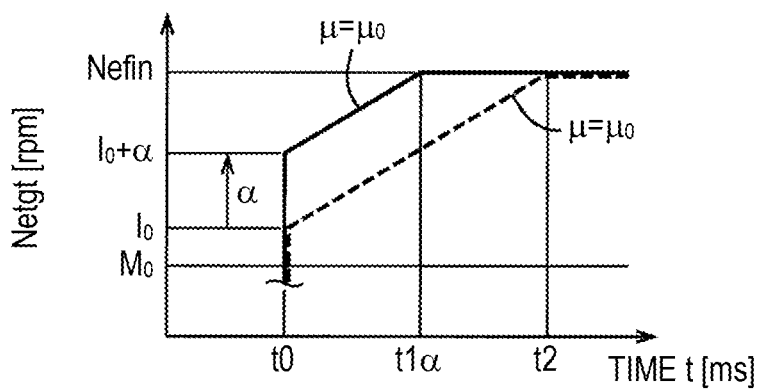
FIGS. 9A to 9C are diagrams illustrating an example of a timing chart for when the control operation of the electronic control unit illustrated in FIG. 8 is performed, where
Figure 9B:
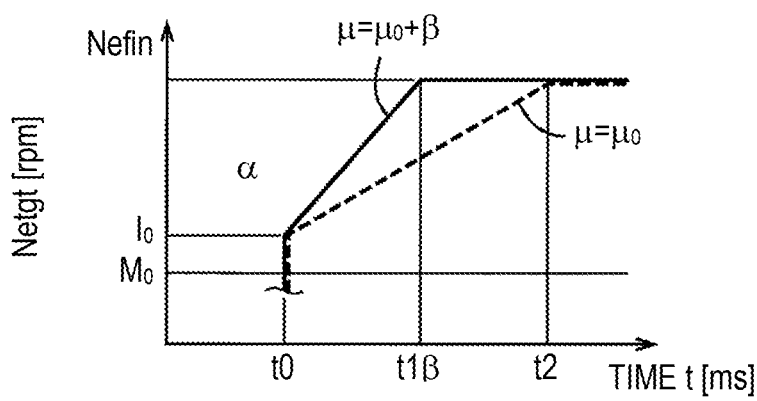
Figure 9C:
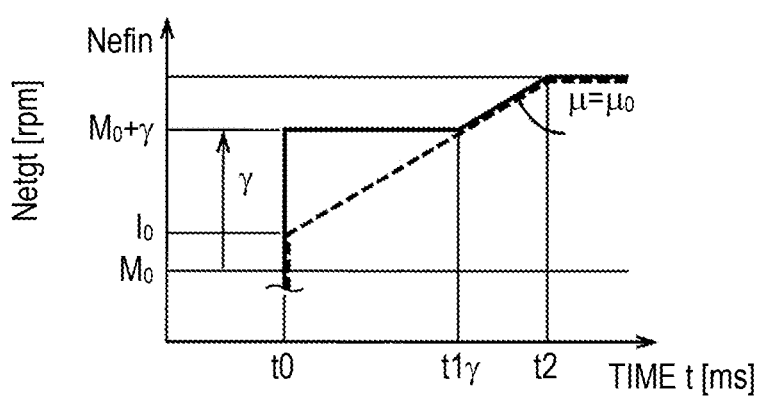

FIGS. 9A to 9C are diagrams illustrating an example of a timing chart for when the control operation of the electronic control unit 100 illustrated in FIG. 8 is performed, where FIG. 9A illustrates an example in which the initial rotation speed Neini is corrected with the initial value correction value α, FIG. 9B illustrates an example in which the rotation speed increase rate μ is corrected with the increase rate correction value β, and FIG. 9C illustrates an example in which the lower-limit rotation speed Nemin is corrected with the lower limit correction value γ. The lower-limit rotation speed Nemin corresponds to a "lower limit" in the present disclosure.

In FIGS. 9A to 9C, the horizontal axis represents time t [ms] and the vertical axis represents the target engine rotation speed Netgt. For the purpose of easy understanding of the disclosure, in FIGS. 9A to 9C, a timing chart for when one of the initial value correction value α, the increase rate correction value β, and the lower limit correction value γ is set is indicated by a solid line, and a timing chart for when none of the initial value correction value α, the increase rate correction value β, and the lower limit correction value γ is set is indicated by a dotted line for the purpose of comparison. When "the initial value correction value α (or the increase rate correction value β or the lower limit correction value γ) is set," it means that the initial value correction value α (or the increase rate correction value β for the lower limit correction value γ) is set to a value greater than 0. When "the initial value correction value α (or the increase rate correction value β or the lower limit correction value γ) is not set," it means that the initial value correction value α (or the increase rate correction value β or the lower limit correction value γ) is set to zero.

First, the timing chart for when all of the initial value correction value α, the increase rate correction value β, and the lower limit correction value γ are zero will be described below with reference to FIG. 9A. The dotted lines in FIGS. 9B and 9C also indicate the timing charts when all of the initial value correction value α, the increase rate correction value β, and the lower limit correction value γ are zero. Since all of the initial value correction value α, the increase rate correction value β, and the lower limit correction value γ are zero, the initial rotation speed Neini is the basic initial value $I_0$, the rotation speed increase rate μ is the basic increase rate $μ_0$, and the lower-limit rotation speed Nemin is the basic lower limit $M_0$. Since the lower-limit rotation speed Nemin $(=M_0)$ has a value less than the initial rotation speed Neini $(=I_0)$, the lower limit guard process is not performed. As indicated by the dotted line in FIG. 9A, the target engine rotation speed Netgt is set to the initial rotation speed Neini $(=I_0)$ at time t0 immediately after the control for producing an acceleration feeling is started. After the setting, the target engine rotation speed Netgt increases at the rotation speed increase rate μ $(=μ_0)$ with the elapse of time t. At time t2, the target engine rotation speed Netgt reaches the final rotation speed Nefin. In this way, the control for producing an acceleration feeling is performed from time t0 to time t2. After time t2, the target engine rotation speed Netgt is maintained at the final rotation speed Nefin.

Then, the timing chart for when the initial value correction value α is set and the increase rate correction value β and the lower limit correction value γ are zero will be described below with reference to FIG. 9A. Since the initial value correction value α is set and the increase rate correction value β and the lower limit correction value γ are zero, the initial rotation speed Neini becomes a value obtained by adding the initial value correction value α to the basic initial value $I_0$, the rotation speed increase rate μ is the basic increase rate $μ_0$, and the lower-limit rotation speed Nemin is the basic lower limit $M_0$. Since the lower-limit rotation speed Nemin $(=M_0)$ has a value less than the initial rotation speed Neini ($=I_0+\alpha$), the lower limit guard process is not performed. As indicated by the solid line in FIG. 9A, the target engine rotation speed Netgt is set to the initial rotation speed Neini ($=I_0+\alpha$) at time t0 immediately after the control for producing an acceleration feeling is started. After the setting, the target engine rotation speed Netgt increases at the rotation speed increase rate $\mu$ ($=\mu_0$) with the elapse of time t. At time t1α, the target engine rotation speed Netgt reaches the final rotation speed Nefin. In this way, the control for producing an acceleration feeling is performed from time t0 to time t1α. After time t1α, the target engine rotation speed Netgt is maintained at the final rotation speed Nefin.

Then, the timing chart for when the increase rate correction value β is set and the initial value correction value α and the lower limit correction value γ are zero will be described below with reference to FIG. 9B. Since the increase rate correction value β is set and the initial value correction value α and the lower limit correction value γ are zero, the initial rotation speed Neini is the basic initial value $I_0$, the rotation speed increase rate $\mu$ becomes a value obtained by adding the increase rate correction value β to the basic increase rate $\mu_0$, and the lower-limit rotation speed Nemin is the basic lower limit $M_0$. Since the lower-limit rotation speed Nemin ($=M_0$) has a value less than the initial rotation speed Neini ($=I_0$), the lower limit guard process is not performed. As indicated by the solid line in FIG. 9B, the target engine rotation speed Netgt is set to the initial rotation speed Neini ($=I_0$) at time t0 immediately after the control for producing an acceleration feeling is started. After the setting, the target engine rotation speed Netgt increases at the rotation speed increase rate $\mu$ ($=\mu_0+\beta$) with the elapse of time t. At time t1β, the target engine rotation speed Netgt reaches the final rotation speed Nefin. In this way, the control for producing an acceleration feeling is performed from time t0 to time t1β. After time t1β, the target engine rotation speed Netgt is maintained at the final rotation speed Nefin.

Then, the timing chart for when the lower limit correction value γ is set and the initial value correction value α and the increase rate correction value β are zero will be described below with reference to FIG. 9C. Since the lower limit correction value γ is set and the initial value correction value α and the increase rate correction value β are zero, the initial rotation speed Neini is the basic initial value $I_0$, the rotation speed increase rate $\mu$ is the basic increase rate $\mu_0$, and the lower-limit rotation speed Nemin becomes a value obtained by adding the lower limit correction value γ to the basic lower limit $M_0$. Since the lower-limit rotation speed Nemin ($=M_0+\gamma$) has a value greater than the initial rotation speed Neini ($=I_0$), the lower limit guard process is performed. As described above, the target engine rotation speed Netgt is set not to be less than the lower-limit rotation speed Nemin. Since the initial rotation speed Neini ($=I_0$) is lower than the lower-limit rotation speed Nemin ($=M_0+\gamma$), the lower limit guard process is performed and, as indicated by the solid line in FIG. 9C, the target engine rotation speed Netgt is set to the lower-limit rotation speed Nemin ($=M_0+\gamma$) at time t0 immediately after the control for producing an acceleration feeling is started. After the setting, the target engine rotation speed Netgt is set to the lower-limit rotation speed Nemin ($=M_0+\gamma$) until time t1γ at which a value increasing from the initial rotation speed Neini at the rotation speed increase rate $\mu$ ($=\mu$) becomes the lower-limit rotation speed Nemin ($=M_0+\gamma$). After time t1γ, the target engine rotation speed Netgt increases at the rotation speed increase rate $\mu$ ($=\mu_0$) with the elapse of time t. At time t2, the target engine rotation speed Netgt reaches the final rotation speed Nefin. In this way, the control for producing an acceleration feeling is performed from time t0 to time t2. After time t2, the target engine rotation speed Netgt is maintained at the final rotation speed Nefin.

Although the timing charts when two or all of the initial value correction value α, the increase rate correction value β, and the lower limit correction value γ are set is not illustrated, for example, the initial rotation speed Neini becomes the sum ($=I_0+\alpha$) of the basic initial value $I_0$ and the initial value correction value α, the rotation speed increase rate $\mu$ becomes the sum ($=\mu_0+\beta$) of the basic increase rate $\mu_0$ and the increase rate correction value β, and the lower-limit rotation speed Nemin becomes the sum ($=M_0+\gamma$) of the basic lower limit $M_0$ and the lower limit correction value γ. Immediately after the control for producing an acceleration feeling is started, the target engine rotation speed Netgt is set to the higher of the initial rotation speed Neini and the lower-limit rotation speed Nemin. After the setting, the target engine rotation speed Netgt is set to the higher of the rotation speed increasing from the initial rotation speed Neini at the rotation speed increase rate $\mu$ with the elapse of time t and the lower-limit rotation speed Nemin. After the target engine rotation speed Netgt reaches the final rotation speed Nefin, the target engine rotation speed Netgt is maintained at the final rotation speed Nefin.

According to this embodiment, there is provided a control device 100 for (A) a hybrid vehicle 10 including an engine 12 with a supercharger 18, a differential unit 60 which is a stepless transmission that is provided in a power transmission path PT between the engine 12 and the driving wheels 16, and a second rotary machine MG2 that is connected to the power transmission path PT and using the engine 12 and the second rotary machine MG2 as drive power sources, the control device 100 including (B) a drive control unit 106 configured (b1) to perform control for producing an acceleration feeling of setting a target engine rotation speed Netgt to an initial rotation speed Neini which is lower than an optimal-fuel-efficiency rotation speed Neeff at which the engine 12 is able to most efficiently output required engine power Pedem, increasing the engine rotation speed Ne from the initial rotation speed Neini to the optimal-fuel-efficiency rotation speed Neeff at a rotation speed increase rate $\mu$ with the elapse of time, and controlling the differential unit 60 such that the engine rotation speed Ne reaches the target engine rotation speed Netgt when an acceleration request is issued and (b2) to control the second rotary machine MG2 such that an output shortage of the engine 12 for the required engine power Pedem which is caused by the engine rotation speed Ne becoming less than the optimal-fuel-efficiency rotation speed Neeff through the control for producing an acceleration feeling is compensated for, (C) wherein the drive control unit 106 is configured (c1) to set the initial rotation speed Neini or a lower-limit rotation speed Nemin which is a lower limit of the initial rotation speed Neini based on a target supercharging pressure of the engine or an amount of change of the target supercharging pressure Pchgtgt of the engine 12 at the time of start of the control for producing an acceleration feeling and (c2) to set the initial rotation speed Neini to a greater value when the target supercharging pressure Pchgtgt is high than when the target supercharging pressure Pchgtgt is low. An output shortage of the engine 12 due to a response delay of the supercharging pressure Pchg is more likely to occur when the target supercharging pressure Pchgtgt is high than when the target supercharging pressure Pchgtgt is low. Accordingly, when an output shortage of the engine 12 is likely to occur, the initial rotation speed Neini of the engine 12 in the control for producing an acceleration feeling or the lower limit of the initial rotation speed Neini is set to a great value such that the engine rotation speed Ne increases in an early stage. As a result, it is possible to curb a decrease in acceleration performance due to a response delay of the supercharging pressure Pchg.

According to this embodiment, the drive control unit 106 sets the initial rotation speed Neini to a greater value as the target supercharging pressure Pchgtgt increases. An output shortage of the engine 12 due to a response delay of the supercharging pressure Pchg is more likely to occur as the target supercharging pressure Pchgtgt becomes greater. Accordingly, when an output shortage of the engine 12 is likely to occur, the initial rotation speed Neini of the engine 12 in the control for producing an acceleration feeling or the lower limit of the initial rotation speed Neini is set to a great value and thus it is possible to curb a decrease in acceleration performance due to a response delay of the supercharging pressure Pchg.

According to this embodiment, (A) the drive control unit 106 (a1) sets the rotation speed increase rate μ based on the target supercharging pressure Pchgtgt and (a2) sets the rotation speed increase rate μ to a greater value when the target supercharging pressure Pchgtgt is high than when the target supercharging pressure Pchgtgt is low. An output shortage of the engine 12 due to a response delay of the supercharging pressure Pchg is more likely to occur when the target supercharging pressure Pchgtgt is high than when the target supercharging pressure Pchgtgt is low. Accordingly, when an output shortage of the engine 12 is likely to occur, the rotation speed increase rate μ of the engine 12 in the control for producing an acceleration feeling is set to a great value such that the engine rotation speed Ne increases rapidly. As a result, it is possible to curb a decrease in acceleration performance due to a response delay of the supercharging pressure Pchg.

According to this embodiment, the drive control unit 106 sets the rotation speed increase rate μ to a greater value as the target supercharging pressure Pchgtgt increases. An output shortage of the engine 12 due to a response delay of the supercharging pressure Pchg is more likely to occur as the target supercharging pressure Pchgtgt becomes greater. Accordingly, when an output shortage of the engine 12 is likely to occur, the rotation speed increase rate μ of the engine 12 in the control for producing an acceleration feeling is set to a great value and thus it is possible to curb a decrease in acceleration performance due to a response delay of the supercharging pressure Pchg.

Figures 10, 11:
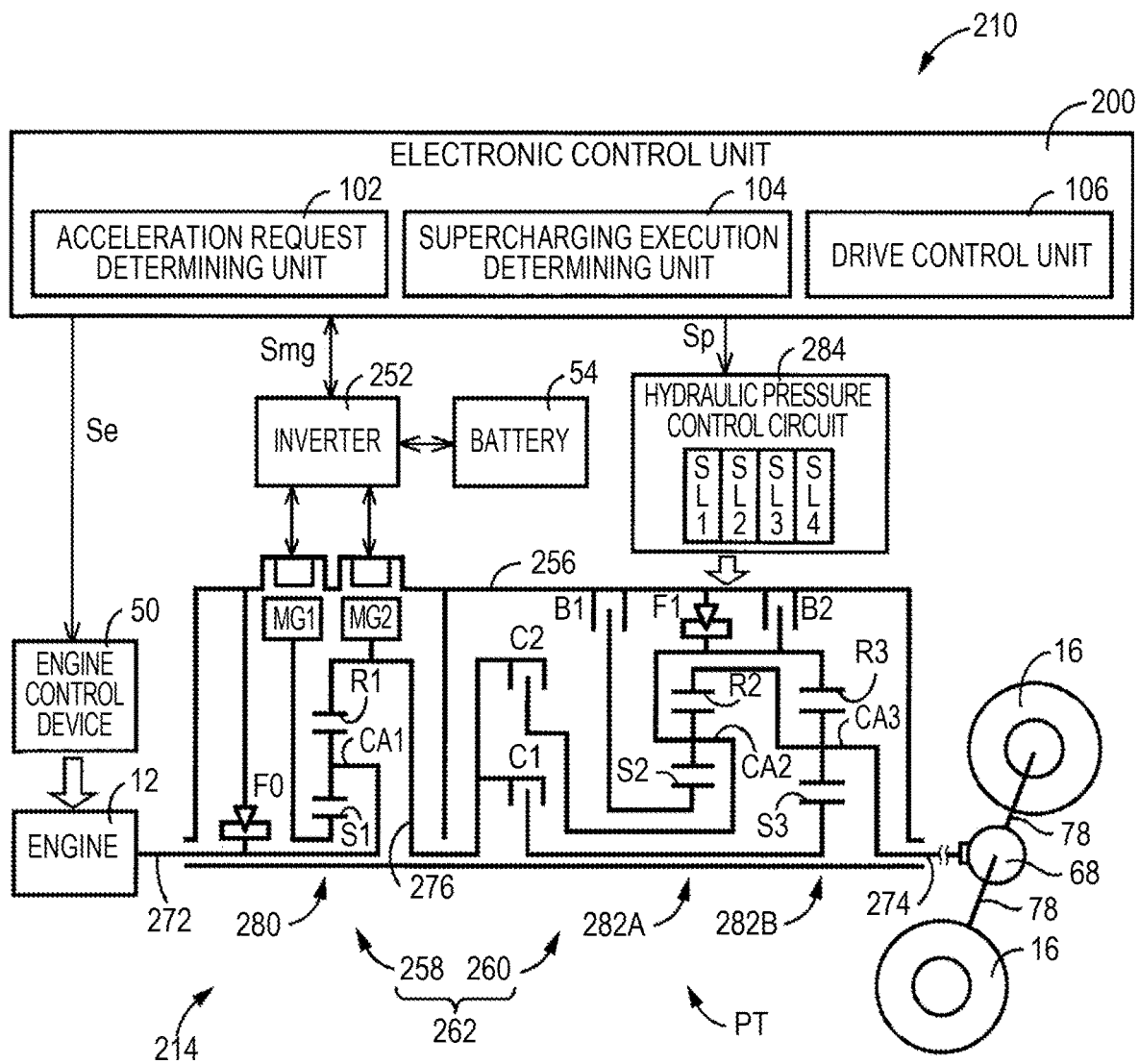
FIG. 10 is a functional block diagram schematically illustrating a configuration of a hybrid vehicle in which an electronic control unit according to a second embodiment of the disclosure is mounted and illustrating principal parts of a control function for various types of control in the hybrid vehicle.
FIG. 11 is an engagement operation table illustrating a relationship between a gear shifting operation of a stepped gear shifting unit illustrated in FIG. 10 and combinations of operating states of engagement devices which are used therein.

FIG. 10 is a functional block diagram schematically illustrating a configuration of a hybrid vehicle 210 in which an electronic control unit 200 according to a second embodiment of the disclosure is mounted and illustrating a principal part of a control function for various types of control in the hybrid vehicle 210. The hybrid vehicle 210 (hereinafter referred to as a "vehicle 210") includes an engine 12, a first rotary machine MG1, a second rotary machine MG2, a power transmission device 214, and driving wheels 16. Elements of the second embodiment which are substantially common to the functions of the first embodiment will be referred to by the same reference signs and description thereof will not be repeated.

An engine torque Te of the engine 12 is controlled by causing an electronic control unit 200 which will be described later to control an engine control device 50 which is provided in the vehicle 210.

The first rotary machine MG1 and the second rotary machine MG2 are connected to a battery 54 which is provided in the vehicle 210 via an inverter 252 which is provided in the vehicle 210. In the first rotary machine MG1 and the second rotary machine MG2, an MG1 torque Tg and an MG2 torque Tm are controlled by causing the electronic control unit 200 which will be described later to control the inverter 252.

The power transmission device 214 includes an electrical stepless gear shifting unit 258 and a mechanical stepped gear shifting unit 260 which are arranged in series on a common axis in a case 256 that is a non-rotary member attached to the vehicle body. The stepless gear shifting unit 258 is connected to the engine 12 directly or indirectly via a damper which is not illustrated or the like. The stepped gear shifting unit 260 is connected to an output side of the stepless gear shifting unit 258. The power transmission device 214 includes a differential gear 68 that is connected to an output shaft 274 which is an output rotary member of the stepped gear shifting unit 260 and a pair of axles 78 that is connected to the differential gear 68. In the power transmission device 214, power which is output from the engine 12 or the second rotary machine MG2 is transmitted to the stepped gear shifting unit 260. The power transmitted to the stepped gear shifting unit 260 is transmitted to the driving wheels 16 via the differential gear 68 or the like. The power transmission device 214 having this configuration is suitably used for a vehicle of a front-engine rear-drive (FR) type. The stepless gear shifting unit 258, the stepped gear shifting unit 260, or the like is disposed to be substantially symmetric with respect to the common axis, and a lower half with respect to the axis is not illustrated in FIG. 10. The common axis is an axis of a crankshaft of the engine 12, an input shaft 272 connected to the crankshaft, or the like. The stepless gear shifting unit 258, the stepped gear shifting unit 260, the differential gear 68, and the axles 78 in the power transmission device 214 constitute the power transmission path PT which is provided between the engine 12 and the driving wheels 16. The second rotary machine MG2 in this embodiment corresponds to a "rotary machine" in the present disclosure.

The stepless gear shifting unit 258 includes a differential mechanism 280 which is a power split mechanism that mechanically splits power of the engine 12 to the first rotary machine MG1 and an intermediate transmission member 276 which is an output rotary member of the stepless gear shifting unit 258. The first rotary machine MG1 is a rotary machine to which power of the engine 12 is transmitted. The second rotary machine MG2 is connected to the intermediate transmission member 276 in a power-transmittable manner. Since the intermediate transmission member 276 is connected to the driving wheels 16 via the stepped gear shifting unit 260, the second rotary machine MG2 is a rotary machine that is connected to the driving wheels 16 in a power-transmittable manner. The differential mechanism 280 is a differential mechanism that splits and transmits power of the engine 12 to the driving wheels 16 and the first rotary machine MG. The stepless gear shifting unit 258 is an electrical stepless transmission in which a differential state of the differential mechanism 280 is controlled by controlling the operating state of the first rotary machine MG1 which is connected to the differential mechanism 280 in a power-transmittable manner. The first rotary machine MG1 is a rotary machine that can control an engine rotation speed Ne. The stepless gear shifting unit 258 corresponds to a "stepless transmission" in the present disclosure.

The differential mechanism 280 is a known single-pinion type planetary gear unit including a sun gear S1, a carrier CA, and a ring gear R1.

The stepped gear shifting unit 260 is a mechanical gear shifting mechanism which is a stepped transmission constituting a part of the power transmission path PT between the intermediate transmission member 276 and the driving wheels 16, that is, an automatic transmission constituting a part of the power transmission path PT between the differential mechanism 280 and the driving wheels 16. The intermediate transmission member 276 also serves as an input rotary member of the stepped gear shifting unit 260. The stepped gear shifting unit 260 is, for example, a known planetary gear type automatic transmission including a plurality of planetary gear mechanisms including a first planetary gear mechanism 282A and a second planetary gear mechanism 282B and a plurality of engagement devices including a clutch C1, a clutch C2, a brake B1, a brake B2, and a one-way clutch F1. In the following description, the clutch C1, the clutch C2, the brake B1, and the brake B2 are simply referred to as engagement devices CB when they are not particularly distinguished from each other. The first planetary gear mechanism 282A is a known single-pinion type planetary gear mechanism including a sun gear S2, a carrier CA2, and a ring gear R2. The second planetary gear mechanism 282B is a known single-pinion type planetary gear mechanism including a sun gear S3, a carrier CA3, and a ring gear R3.

The differential mechanism 280, the first planetary gear mechanism 282A, the second planetary gear mechanism 282B, the engagement devices CB, the one-way clutch F1, the first rotary machine MG1, and the second rotary machine MG2 are connected as illustrated in FIG. 10. In the differential mechanism 280, the carrier CA1 serves as an input element, the sun gear S1 serves as a reaction element, and the ring gear R1 serves as an output element.

Each engagement device CB is a hydraulic frictional engagement device. An engagement torque which is a torque capacity of each engagement device CB is changed using regulated engagement oil pressures which are output from solenoid valves SL1 to SL4 in a hydraulic pressure control circuit 284 provided in the vehicle 210. Accordingly, the operating state such as an engaged state or a disengaged state of each engagement device CB is switched.

In the stepped gear shifting unit 260, one gear stage of a plurality of gear stages with different gear ratios γat (=AT input rotation speed Nati [rpm]/AT output rotation speed Nato [rpm]) is formed by switching a combination of operating states of a plurality of engagement devices CB. In this embodiment, a gear stage which is formed in the stepped gear shifting unit 260 is referred to as an AT gear stage. The AT input rotation speed Nati is an input rotation speed of the stepped gear shifting unit 260 and has the same value as a rotation speed of the intermediate transmission member 276 and the same value as an MG2 rotation speed Nm. The AT output rotation speed Nato is a rotation speed of the output shaft 274 which is an output rotary member of the stepped gear shifting unit 260 and is also an output rotation speed of a composite transmission 262 which is a combined transmission including the stepless gear shifting unit 258 and the stepped gear shifting unit 260.

FIG. 11 is an engagement operation table illustrating a relationship between a gear shifting operation of the stepped gear shifting unit 260 illustrated in FIG. 10 and a combination of operating states of the engagement devices CB which are used therein. In the stepped gear shifting unit 260, for example, four AT gear stages for forward movement including a first AT gear stage ("1st" in FIG. 11) to a fourth AT gear stage ("4th" in FIG. 11) are formed as a plurality of AT gear stages. The gear ratio γat of the first AT gear stage is the highest and the gear ratio γat becomes lower in higher AT gear stages. An AT gear stage for reverse movement ("Rev" in FIG. 11) is formed, for example, by engagement of the clutch C1 and engagement of the brake B2. That is, for example, the first AT gear stage is formed at the time of reverse travel as will be described later. In FIG. 11, "O" denotes an engaged state, "Δ" denotes an engaged state at the time of engine braking or at the time of coast downshift of the stepped gear shifting unit 260, and a blank denotes a disengaged state. A coast downshift is, for example, a downshift which is performed in a decelerating travel state with an accelerator turned off out of downshifts which are performed due to a decrease in the vehicle speed V during decelerating travel with the accelerator turned off (the accelerator opening θacc is 0 or substantially 0).

In the stepped gear shifting unit 260, for example, an AT gear stage which is formed according to the accelerator opening θacc which is an amount of operation of an accelerator by a driver, the vehicle speed V, or the like is switched, that is, a plurality of AT gear stages is selectively formed, by the electronic control unit 200 which will be described later. For example, in gear shifting control of the stepped gear shifting unit 260, so-called clutch-to-clutch gear shifting in which gear shifting is performed by switching one of the engagement devices CB, that is, gear shifting is performed by switching of the engagement devices CB between engagement and disengagement, is performed.

The vehicle 210 additionally includes a one-way clutch F0 (see FIG. 10). The one-way clutch F0 is a lock mechanism that can fix the carrier CA to be non-rotatable. That is, the one-way clutch F0 is a lock mechanism that can fix the input shaft 272 which is connected to the crankshaft of the engine 12 and which rotates integrally with the carrier CAT to the case 256. In the one-way clutch F0, one member of two members that are rotatable relative to each other is integrally connected to the input shaft 272 and the other member is integrally connected to the case 256. The one-way clutch F0 idles in a positive rotating direction which is a rotating direction at the time of operation of the engine 12 and is automatically engaged in a negative rotating direction which is opposite to that at the time of operation of the engine 12. Accordingly, when the one-way clutch F0 idles, the engine 12 is rotatable relative to the case 256. On the other hand, when the one-way clutch F0 is engaged, the engine 12 is not rotatable relative to the case 256. That is, the engine 12 is fixed to the case 256 by engagement of the one-way clutch F0. In this way, the one-way clutch F0 permits rotation in the positive rotating direction of the carrier CAT which is a rotating direction at the time of operation of the engine 12 and prohibits rotation in the negative rotating direction of the carrier CA. That is, the one-way clutch F0 is a lock mechanism that can permit rotation in the positive rotating direction of the engine 12 and prohibit rotation in the negative rotating direction of the engine 12.

In the vehicle 210, when the rotation speed of the sun gear S1 increases or decreases by controlling the rotation speed of the first rotary machine MG1 with respect to the rotation speed of the ring gear R1 which is constrained on rotation of the driving wheels 16 by formation of an AT gear stage in the stepped gear shifting unit 260, the rotation speed of the carrier CA1, that is, the engine rotation speed Ne, increases or decreases. That is, in the HV travel mode in which HV travel using at least the engine 12 as a drive power source is possible, the engine 12 can operate at an operating point with high efficiency. Accordingly, in the HV travel mode, when the required drive power Pwdem of the vehicle 210 changes, the target engine operating point OPengtgt can be set through the control for producing an acceleration feeling of the required engine power Pedem for realizing the required drive power Pwdem.

The vehicle 210 further includes an electronic control unit 200 which is a controller including a control device for the vehicle 210 associated with control of the engine 12, the first rotary machine MG1, the second rotary machine MG2, and the like. The electronic control unit 200 has the same configuration as the electronic control unit 100 described above in the first embodiment. The electronic control unit 200 is supplied with various signals which are the same as those supplied to the electronic control unit 100. Various command signals which are the same as those output from the electronic control unit 100 are output from the electronic control unit 200. The electronic control unit 200 has functions equivalent to the functions of the acceleration request determining unit 102, the supercharging execution determining unit 104, and the drive control unit 106 similarly to the electronic control unit 100. Accordingly, similarly to the first embodiment, an output shortage of the engine 12 due to a response delay of the supercharging pressure Pchg is more likely to occur when the target supercharging pressure Pchgtgt is high than when the target supercharging pressure Pchgtgt is low. Accordingly, when an output shortage of the engine 12 is likely to occur, the initial rotation speed Neini of the engine 12 in the control for producing an acceleration feeling or the lower limit of the initial rotation speed Neini is set to a great value such that the engine rotation speed Ne increases in an early stage. As a result, it is possible to curb a decrease in acceleration performance due to a response delay of the supercharging pressure Pchg. The engine 12 and the differential mechanism 280 which is a stepless transmission are controlled such that the engine rotation speed Ne reaches the target engine rotation speed Netgt. The electronic control unit 200 corresponds to a "control device" in the present disclosure.

According to this embodiment, the same advantages as in the first embodiment are obtained.

Figure 12:
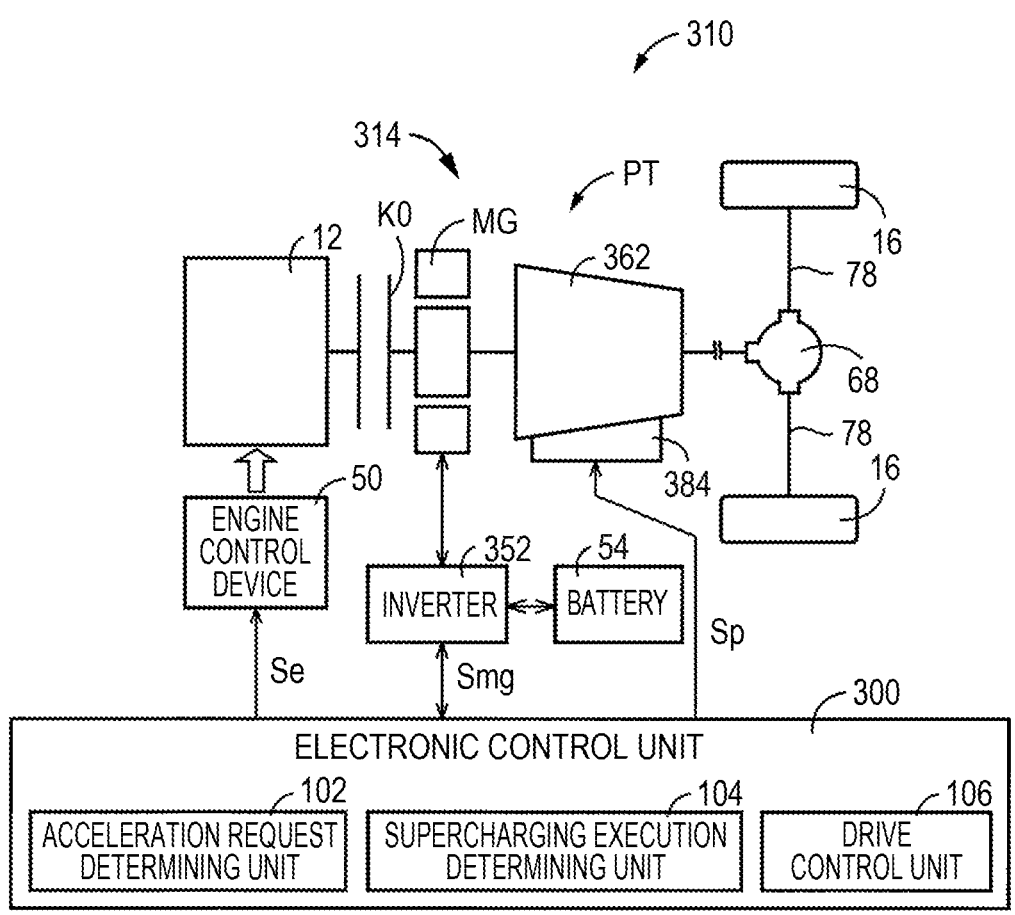
FIG. 12 is a functional block diagram schematically illustrating a configuration of a hybrid vehicle in which an electronic control unit according to a third embodiment of the disclosure is mounted and illustrating principal parts of a control function for various types of control in the hybrid vehicle.

FIG. 12 is a functional block diagram schematically illustrating a configuration of a hybrid vehicle 310 in which an electronic control unit 300 according to a third embodiment of the disclosure is mounted and illustrating a principal part of a control function for various types of control in the hybrid vehicle 310. The hybrid vehicle 310 (hereinafter referred to as a "vehicle 310") includes an engine 12, a rotary machine MG, a power transmission device 314, and driving wheels 16. Elements of the third embodiment which are substantially common to the functions of the first embodiment will be referred to by the same reference signs and description thereof will not be repeated.

An engine torque Te of the engine 12 is controlled by causing an electronic control unit 300 which will be described later to control an engine control device 50 which is provided in the vehicle 310.

The rotary machine MG is a rotary electric machine having a function of an electric motor and a function of a power generator and is called a motor generator. The rotary machine MG is connected to a battery 54 which is provided in the vehicle 310 via an inverter 352 which is provided in the vehicle 310. Regarding the rotary machine MG, an MG torque Tmg [Nm] which is an output torque of the rotary machine MG is controlled by causing the electronic control unit 300 which will be described later to control the inverter 352. Electric power Wg which is generated by the rotary machine MG is charged in the battery 54 or is consumed in an auxiliary machine such as an air conditioner. The rotary machine MG outputs the MG torque Tmg using electric power from the battery 54.

The power transmission device 314 includes a clutch K0 and an automatic transmission 362. An input rotary member of the automatic transmission 362 is connected to the engine 12 via the clutch K0 and is directly connected to the rotary machine MG. The power transmission device 314 includes a differential gear 68 that is connected to an output side of the automatic transmission 362 and a pair of axles 78 that is connected to the differential gear 68. In the power transmission device 314, power of the engine 12 is transmitted to the driving wheels 16 sequentially via the clutch K0, the automatic transmission 362, the differential gear 68, the pair of axles 78, and the like. Power of the rotary machine MG is transmitted to the driving wheels 16 via the automatic transmission 362 and the like. The engine 12 and the rotary machine MG are drive power sources for travel of the vehicle 310 that are connected to the driving wheels 16 in a power-transmittable manner. The clutch K0, the automatic transmission 362, the differential gear 68, and the axles 78 in the power transmission device 314 constitute the power transmission path PT which is provided between the engine 12 and the driving wheels 16. The rotary machine MG also has a function of a starter that cranks the engine 12 in a state in which the clutch K0 is engaged. The rotary machine MG in this embodiment corresponds to a "rotary machine" in the present disclosure.

The clutch K0 is a hydraulic frictional engagement device that connects or disconnects the power transmission path PT between the engine 12 and the driving wheels 16.

The automatic transmission 362 is, for example, a known stepless transmission such as a belt-type stepless transmission including a primary pulley, a secondary pulley, and an electric belt which is suspended between the pulleys. In the automatic transmission 362, V-groove widths of the primary pulley and the secondary pulley are changed by a hydraulic pressure control circuit 384 which is controlled by the electronic control unit 300 which will be described later and a suspending distance of the electric belt (an effective distance) is changed. Accordingly, the gear ratio γat of the automatic transmission 362 changes in a stepless manner. The automatic transmission 362 corresponds to a "stepless transmission" in the present disclosure.

The vehicle 310 can perform EV travel in which only the rotary machine MG is used as a drive power source for travel using electric power from the battery 54 in a state in which the clutch K0 is disengaged and operation of the engine 12 is stopped. The vehicle 310 can perform hybrid travel in which the engine 12 operates in a state in which the clutch K0 is engaged and at least the engine 12 is used as a drive power source for travel.

The vehicle 310 includes an engine-driven travel mode using only the engine 12 as a drive power source and an HV travel mode using the engine 12 and the rotary machine MG as drive power sources in a state in which the clutch K0 is engaged. When the required drive power Pwdem in the vehicle 310 changes in any one of the engine-driven travel mode and the HV travel mode, a target engine operating point OPengtgt is set through the control for producing an acceleration feeling on a required engine power Pedem for realizing the required drive power Pwdem.

The vehicle 310 further includes the electronic control unit 300 which is a controller including a control device for the vehicle 310 associated with control of the engine 12, the rotary machine MG, and the like. The electronic control unit 300 has the same configuration as the electronic control unit 100 described above in the first embodiment. The electronic control unit 300 is supplied with various signals which are the same as those supplied to the electronic control unit 100. An MG rotation speed Nmg [rpm] which is the rotation speed of the rotary machine MG which is detected by an MG rotation speed sensor which is not illustrated is input instead of the MG rotation speed Ng and the MG2 rotation speed Nm. Various command signals which are the same as those output from the electronic control unit 100 are output from the electronic control unit 300. Here, the rotary machine control command signal Sing is a command signal for controlling the rotary machine MG. The electronic control unit 300 has functions equivalent to the functions of the acceleration request determining unit 102, the supercharging execution determining unit 104, and the drive control unit 106 similarly to the electronic control unit 100. Accordingly, similarly to the first embodiment, an output shortage of the engine 12 due to a response delay of the supercharging pressure Pchg is more likely to occur when the target supercharging pressure Pchgtgt is high than when the target supercharging pressure Pchgtgt is low. Accordingly, when an output shortage of the engine 12 is likely to occur, the initial rotation speed Neini of the engine 12 in the control for producing an acceleration feeling or the lower limit of the initial rotation speed Neini is set to a great value such that the engine rotation speed Ne increases in an early stage. The engine rotation speed Ne reaches the target engine rotation speed Netgt by controlling the engine 12 and the automatic transmission 362 which is an automatic transmission. The electronic control unit 300 corresponds to a "control device" in the present disclosure.

According to this embodiment, the same advantages as in the first embodiment are obtained.

While embodiments of the disclosure have been described above in detail with reference to the accompanying drawings, the disclosure can be applied to other aspects.

In the first to third embodiments described above, the target engine operating point OPengtgt changes on the path a passing over the maximum efficiency line Leng, but the disclosure is not limited thereto. For example, the target engine operating point OPengtgt may change along a path which is temporarily separated from the path a passing over the maximum efficiency line Leng in the control for producing an acceleration feeling.

In the first to third embodiments described above, the control for producing an acceleration feeling is performed such that the target engine rotation speed Ne is set to the initial rotation speed Neini and then increases from the initial rotation speed Neini at a rotation speed increase rate μ with the elapse of time t, but the disclosure is not limited thereto. For example, the control for producing an acceleration feeling may be performed such that the target engine rotation speed Netgt increases from the initial rotation speed Neini at a rotation speed increase rate μ* with an increase in the vehicle speed V (a rate of increase of the engine rotation speed Ne with respect to an increase of the vehicle speed V) instead of the elapse of time t. This is because a feeling of acceleration is rendered even when the target engine rotation speed Netgt increases from the initial rotation speed Neini at the rotation speed increase rate μ* with an increase in the vehicle speed V. An increase in the vehicle speed V means an increase in the vehicle speed V immediately after the control for producing an acceleration feeling in which the target engine operating point OPeng is changed to an initial operating point Opengini is started, and corresponds to an "increase in a vehicle speed" in the present disclosure. In the control for producing an acceleration feeling, the target engine rotation speed Netgt may be increased from the initial rotation speed Neini at a rotation speed increase rate μ** based on both the increase in the vehicle speed V and the elapse of time t (a rate of increase of the engine rotation speed Ne with the increase in the vehicle speed V and the elapse of time t as two variables). Accordingly, in the control for producing an acceleration feeling, the target engine rotation speed Netgt may be increased from the initial rotation speed Neini at the rotation speed increase rate μ (or μ* or μ**) based on at least one of the increase in the vehicle speed V and the elapse of time t.

In the first to third embodiments described above, as the target supercharging pressure Pchgtgt increases, the initial rotation speed Neini set to a greater value, the rotation speed increase rate μ is set to a greater value, and the lower-limit rotation speed Nemin is set to a greater value, but the disclosure is not limited thereto. For example, by increasing the initial value correction value α, the increase rate correction value β, and the lower limit correction value γ in a so-called steplike (step-shaped) manner with an increase in the target supercharging pressure Pchgtgt, the initial rotation speed Neini may be set to a greater value, the rotation speed increase rate μ may be set to a greater value, and the lower-limit rotation speed Nemin may be set to a greater value, when the target supercharging pressure Pchgtgt is high than when the target supercharging pressure Pchgtgt is low. That is, the initial rotation speed Neini, the rotation speed increase rate μ, and the lower-limit rotation speed Nemin may be set to the same value in a narrow range of the target supercharging pressure Pchgtgt, but the initial rotation speed Neini may be set to a greater value, the rotation speed increase rate μ may be set to a greater value, and the lower-limit rotation speed Nemin may be set to a greater value, when the target supercharging pressure Pchgtgt is high than when the target supercharging pressure Pchgtgt is low, in a wide range of the target supercharging pressure Pchgtgt.

In the first to third embodiments described above, the initial rotation speed Neini or the lower-limit rotation speed Nemin is set to a greater value when the target supercharging pressure Pchgtgt is high than when the target supercharging pressure Pchgtgt is low, but the disclosure is not limited thereto. For example, "when an amount of change of the target supercharging pressure ΔPchgtgt is great than when an amount of change of the target supercharging pressure ΔPchgtgt is small" may be used instead of "when the target supercharging pressure Pchgtgt is high than when the target supercharging pressure Pchgtgt is low." Here, the amount of change of the target supercharging pressure ΔPchgtgt [Pa] is a difference between the target supercharging pressure Pchgtgt at the time of starting of the control for producing an acceleration feeling (that is, the supercharging pressure Pchg at the time of ending of the control for producing an acceleration feeling) and the target supercharging pressure Pchgtgt immediately before the control for producing an acceleration feeling is started (that is, the supercharging pressure Pchg immediately before the control for producing an acceleration feeling is started). An output shortage of the engine 12 due to a response delay of the supercharging pressure Pchg is more likely to occur when the amount of change of the target supercharging pressure ΔPchgtgt is great than when the amount of change of the target supercharging pressure ΔPchgtgt is small. Accordingly, the initial rotation speed Neini or the lower-limit rotation speed Nemin of the engine 12 in the control for producing an acceleration feeling is set to a greater value when the amount of change of the target supercharging pressure ΔPchgtgt is great than when the amount of change of the target supercharging pressure ΔPchgtgt is small, and thus the engine rotation speed Ne is set to increase in an earlier stage. Accordingly, it is possible to curb a decrease in acceleration performance due to a response delay of the supercharging pressure Pchg.

In the first to third embodiments described above, the rotation speed increase rate μ is set to a greater value when the target supercharging pressure Pchgtgt is high than when the target supercharging pressure Pchgtgt is low, but the disclosure is not limited thereto. For example, "when the amount of change of the target supercharging pressure ΔPchgtgt is great than when the amount of change of the target supercharging pressure ΔPchgtgt is small" may be used instead of "when the target supercharging pressure Pchgtgt is high than when the target supercharging pressure Pchgtgt is low." An output shortage of the engine 12 due to a response delay of the supercharging pressure Pchg is more likely to occur when the amount of change of the target supercharging pressure ΔPchgtgt is great than when the amount of change of the target supercharging pressure ΔPchgtgt is small. Accordingly, the rotation speed increase rate μ of the engine 12 in the control for producing an acceleration feeling is set to a greater value when the amount of change of the target supercharging pressure ΔPchgtgt is great than when the amount of change of the target supercharging pressure ΔPchgtgt is small, and thus the engine rotation speed Ne is set to increase in an earlier stage. Accordingly, it is possible to curb a decrease in acceleration performance due to a response delay of the supercharging pressure Pchg.

In the first to third embodiments described above, when the target supercharging pressure Pchgtgt is high than when the target supercharging pressure Pchgtgt is low, the initial rotation speed Neini is set to a greater value, the rotation speed increase rate μ is set to a greater value, and the lower-limit rotation speed Nemin is set to a greater value, but the disclosure is not limited thereto. For example, one of "setting the initial rotation speed Neini to a greater value" and "setting the lower-limit rotation speed Nemin to a greater value" when the target supercharging pressure Pchgtgt is high than when the target supercharging pressure Pchgtgt is low has only to be performed. When one of "setting the initial rotation speed Neini to a greater value" and "setting the lower-limit rotation speed Nemin to a greater value" is performed, the engine rotation speed Ne increases rapidly in an earlier stage and thus it is possible to curb a decrease in acceleration performance due to a response delay of the supercharging pressure Pchg in the control for producing an acceleration feeling.

In the first embodiment, the vehicle 10 may be a vehicle which does not include the gear shifting unit 58 and in which the engine 12 is connected to the differential unit 60. The differential unit 60 may be a mechanism in which a differential operation can be limited by control of a clutch or brake connected to the rotary elements of the second planetary gear mechanism 82. The second planetary gear mechanism 82 may be a double pinion type planetary gear unit. The second planetary gear mechanism 82 may be a differential mechanism including four or more rotary elements by connection between a plurality of planetary gear units. The second planetary gear mechanism 82 may be a differential gear mechanism in which the first rotary machine MG1 and the drive gear 74 are connected to a pinion which is rotationally driven by the engine 12 and a pair of bevel gears engaging with the pinion, respectively. The second planetary gear mechanism 82 may be a mechanism with a configuration in which some rotary elements of two or more planetary gear units are connected to each other and the engine 12, the first rotary machine MG1, and the driving wheels 16 are connected to the rotary elements of such planetary gear units in a power-transmittable manner.

In the second embodiment, the one-way clutch F0 is exemplified as a lock mechanism that can fix the carrier CAT in a non-rotatable manner, but the disclosure is not limited to the aspect. This lock mechanism may be an engagement device such as an engaging clutch, a hydraulic frictional engagement device such as a clutch or a brake, a dry engagement device, an electromagnetic frictional engagement device, or a magnetic powder type clutch which selectively connects the input shaft 272 and the case 256. Alternatively, the vehicle 210 does not have to include the one-way clutch F0.

In the first to third embodiments described above, the supercharger 18 is a known exhaust turbine type supercharger, but the disclosure is not limited to this aspect. For example, the supercharger 18 may be a mechanical pump type supercharger that is rotationally driven by the engine or the electric motor. An exhaust turbine type supercharger and a mechanical pump type supercharger may be provided together as a supercharger.

The above embodiments are merely examples of the disclosure, and the disclosure can be embodied in various aspects which have been subjected to various modifications and improvements based on knowledge of those skilled in the art without departing from the gist of the disclosure.

What is claimed is:

1. A control device for a hybrid vehicle including an engine with a supercharger, a stepless transmission that is provided in a power transmission path between the engine and driving wheels, and a rotary machine that is connected to the power transmission path and using the engine and the rotary machine as drive power sources, the control device comprising:
    a drive control unit configured to perform control for producing an acceleration feeling of setting a target value of an engine rotation speed to an initial engine rotation speed which is lower than an optimal-fuel-efficiency rotation speed at which the engine is able to most efficiently output required engine power, increasing the target value of the engine rotation speed from the initial engine rotation speed to the optimal-fuel-efficiency rotation speed at a rotation speed increase rate based on at least one of an increase in a vehicle speed and elapse of time, and
    controlling the stepless transmission such that the engine rotation speed reaches the target value when an acceleration request is issued, the drive control unit being configured to control the rotary machine such that an output shortage of the engine for the required engine power which is caused by the engine rotation speed becoming less than the optimal-fuel-efficiency rotation speed through the control for producing the acceleration feeling is supplemented,
    wherein the initial engine rotation speed is a target value of the engine rotation speed set immediately at the start of or after the start of the control for producing an acceleration feeling, the drive control unit is configured to set the initial engine rotation speed based on a target supercharging pressure of the engine at the time of start of the control for producing the acceleration feeling and to set the initial engine rotation speed to a greater value when the target supercharging pressure is high than when the target supercharging pressure is low, and wherein the stepless transmission is configured to electrically control a gear ratio.

2. The control device for a hybrid vehicle according to claim 1, wherein the drive control unit is configured to set the rotation speed increase rate based on the target supercharging pressure to a greater value when the target supercharging pressure is high than when the target supercharging pressure is low or when the amount of change of the target supercharging pressure is great than when the amount of change of the target supercharging pressure is small.

3. The control device for a hybrid vehicle according to claim 1, wherein the drive control unit is configured to set the rotation speed increase rate to a greater value as the target supercharging pressure increases.

\* \* \* \* \*